United States Patent
Hosaka et al.

(10) Patent No.: US 9,587,050 B2
(45) Date of Patent: Mar. 7, 2017

(54) PRODUCTION METHOD FOR SOLID CATALYST COMPONENT FOR POLYMERIZING OLEFINS, CATALYST FOR POLYMERIZING OLEFINS, AND PRODUCTION METHOD FOR POLYMERIZED OLEFINS

(71) Applicant: TOHO TITANIUM CO., LTD., Chigasaki-shi (JP)

(72) Inventors: Motoki Hosaka, Chigasaki (JP);
Noriaki Nakamura, Chigasaki (JP);
Shingo Yamada, Chigasaki (JP);
Toshihiko Sugano, Chigasaki (JP)

(73) Assignee: TOHO TITANIUM CO., LTD., Chigasaki-shi (JP)

( * ) Notice: Subject to any disclaimer, the term of this patent is extended or adjusted under 35 U.S.C. 154(b) by 0 days.

(21) Appl. No.: 14/427,143

(22) PCT Filed: Feb. 13, 2014

(86) PCT No.: PCT/JP2014/053331
§ 371 (c)(1),
(2) Date: Mar. 10, 2015

(87) PCT Pub. No.: WO2014/132806
PCT Pub. Date: Sep. 4, 2014

(65) Prior Publication Data
US 2015/0240002 A1  Aug. 27, 2015

(30) Foreign Application Priority Data
Feb. 27, 2013 (JP) .................................. 2013-037829

(51) Int. Cl.
C08F 110/06 (2006.01)
C08F 210/06 (2006.01)
C08F 299/02 (2006.01)
C08F 10/00 (2006.01)

(52) U.S. Cl.
CPC ............ C08F 110/06 (2013.01); C08F 10/00 (2013.01); C08F 210/06 (2013.01); C08F 299/02 (2013.01)

(58) Field of Classification Search
None
See application file for complete search history.

(56) References Cited

U.S. PATENT DOCUMENTS

| | | | |
|---|---|---|---|
| 5,494,872 A | 2/1996 | Hosaka et al. | |
| 5,498,770 A | 3/1996 | Hosaka et al. | |
| 5,684,173 A | 11/1997 | Hosaka et al. | |
| 5,932,510 A | 8/1999 | Hosaka et al. | |
| 5,965,478 A | 10/1999 | Goto et al. | |
| 6,156,690 A | 12/2000 | Hosaka | |
| 6,228,793 B1 | 5/2001 | Hosaka et al. | |
| 6,664,209 B1 | 12/2003 | Hosaka | |
| 6,670,497 B2 | 12/2003 | Tashino et al. | |
| 6,770,586 B2 | 8/2004 | Tashino et al. | |
| 6,855,656 B2 | 2/2005 | Hosaka et al. | |
| 7,005,399 B2 | 2/2006 | Hosaka | |
| 7,141,634 B2 | 11/2006 | Hosaka et al. | |
| 7,704,910 B2 | 4/2010 | Hosaka et al. | |
| 8,247,504 B2 | 8/2012 | Yano et al. | |
| 8,426,537 B2 | 4/2013 | Hosaka | |
| 8,648,001 B2 | 2/2014 | Hosaka et al. | |
| 2005/0054773 A1 | 3/2005 | Hosaka et al. | |
| 2005/0227856 A1 | 10/2005 | Hosaka et al. | |
| 2009/0253873 A1 | 10/2009 | Hosaka et al. | |
| 2009/0253874 A1 | 10/2009 | Hosaka et al. | |
| 2010/0190942 A1 | 7/2010 | Hosaka et al. | |
| 2010/0273641 A1* | 10/2010 | Chen ................ | C08F 110/06 502/126 |
| 2014/0221583 A1 | 8/2014 | Uozumi et al. | |
| 2015/0166693 A1* | 6/2015 | Hosaka ............. | C08F 110/06 526/125.3 |

FOREIGN PATENT DOCUMENTS

| | | | |
|---|---|---|---|
| JP | 54-131589 | | 10/1979 |
| JP | H-10212319 A | * | 8/1998 |
| JP | 2004-107462 | | 4/2004 |
| JP | 2014-037521 | | 2/2014 |
| WO | 2012-060361 | | 5/2012 |
| WO | WO 201401391 A1 | * | 1/2014 ............ C08F 110/06 |

OTHER PUBLICATIONS

Machine translation of Sato et al. (JPH10212319A).*
U.S. Appl. No. 14/770,974, filed Aug. 27, 2015, Sugano, et al.
U.S. Appl. No. 14/427,169, filed Mar. 10, 2015, Hosaka, et al.
U.S. Appl. No. 14/427,204, filed Mar. 10, 2015, Hosaka, et al.
U.S. Appl. No. 14/407,184, filed Dec. 11, 2014, Hosaka, et al.
U.S. Appl. No. 08/04,171, filed Apr. 1, 1993, Hosaka, et al.
U.S. Appl. No. 14/427,099, filed Mar. 10, 2015, Hosaka, et al.
International Search Report Issued May 27, 2014 in PCT/JP14/053331 Filed Feb. 13, 2014.

* cited by examiner

Primary Examiner — Catherine S Branch
(74) Attorney, Agent, or Firm — Oblon, McClelland, Maier & Neustadt, L.L.P.

(57) ABSTRACT

A method for producing a solid catalyst component for olefin polymerization produces a novel solid catalyst component for olefin polymerization that achieves excellent olefin polymerization activity and activity with respect to hydrogen during polymerization, and can produce an olefin polymer that exhibits a high MFR, high stereoregularity, and excellent rigidity. The method includes a first step that brings a magnesium compound, a tetravalent titanium halide compound, and one or more first internal electron donor compounds excluding an aromatic dicarboxylic acid diester into contact with each other to effect a reaction, followed by washing; a second step that brings a tetravalent titanium halide compound and one or more second internal electron donor compounds into contact with a product obtained by the first step to effect a reaction, followed by washing; and a third step that brings one or more third internal electron donor compounds into contact with a product obtained by the second step to effect a reaction.

5 Claims, No Drawings

PRODUCTION METHOD FOR SOLID CATALYST COMPONENT FOR POLYMERIZING OLEFINS, CATALYST FOR POLYMERIZING OLEFINS, AND PRODUCTION METHOD FOR POLYMERIZED OLEFINS

TECHNICAL FIELD

The present invention relates to a method for producing a solid catalyst component for olefin polymerization, a method for producing an olefin polymerization catalyst, and a method for producing an olefin polymer.

BACKGROUND ART

An olefin (e.g., propylene) has been polymerized using an olefin polymerization catalyst. The resulting olefin polymer may be melted, molded using a molding machine, a stretching machine, or the like, and used for a variety of applications (e.g., automotive parts, home appliance parts, containers, and films).

A solid catalyst component that includes magnesium, titanium, an electron donor compound, and a halogen atom as essential components has been known as a component of the olefin polymerization catalyst. A number of olefin polymerization catalysts have been proposed that include the solid catalyst component, an organoaluminum compound, and an organosilicon compound.

An olefin polymer that exhibits higher flowability (melt flow rate (MFR)) has been desired, when molded using a molding machine, a stretching machine, or the like.

The MFR of an olefin polymer depends largely on the molecular weight of the olefin polymer, and an olefin polymer having a low molecular weight tends to have a high MFR. Therefore, the molecular weight of an olefin polymer is normally reduced by adding a large amount of hydrogen during polymerization in order to obtain an olefin polymer having a high MFR.

In recent years, an olefin polymer that has a high MFR, high stereoregularity, a reduced thickness, and high physical strength (i.e., excellent rigidity) has been desired for producing large home appliance parts and automotive parts (particularly a bumper).

In view of the above situation, the applicant of the present application proposed an olefin polymerization catalyst and an olefin polymerization method using the olefin polymerization catalyst, the olefin polymerization catalyst including a solid catalyst component, an organoaluminum compound, and an organosilicon compound, the solid catalyst component being obtained by bringing a magnesium compound, a tetravalent titanium halide compound, a malonic acid diester (internal electron donor compound), and a phthalic acid diester (internal electron donor compound) into contact with each other (see Patent Document 1 (JP-A-2004-107462)).

RELATED-ART DOCUMENT

Patent Document

Patent Document 1: JP-A-2004-107462

SUMMARY OF THE INVENTION

Technical Problem

The olefin polymerization catalyst disclosed in Patent Document 1 exhibits excellent activity with respect to hydrogen as compared with known polymerization catalysts, and an olefin polymer obtained using the solid catalyst component disclosed in Patent Document 1 exhibits high flowability (MFR) when melted, and is particularly useful when producing a large molded article by injection molding or the like.

According to further studies conducted by the inventors of the invention, however, it was found that it is necessary to increase the amount of each internal electron donor compound in order to obtain a solid catalyst component having the desired internal electron donor compound content by simultaneously bringing two or more different internal electron donor compounds into contact with the other components to effect a reaction. As a result, an excess amount of complex of electron donor compound and the tetravalent titanium halide compound is easily formed, and the polymerization activity and the stereoregularity of the resulting olefin polymer easily decrease when using the resulting solid catalyst component as a component of an olefin polymerization catalyst.

Moreover, an olefin polymerization catalyst that can produce an olefin polymer with higher rigidity has been desired.

When producing a large molded article by injection molding or the like, it may be necessary to use a copolymer of two or more α-olefins (e.g., propylene and ethylene) instead of a homopolymer of a single olefin (e.g., propylene).

Therefore, a solid catalyst component for olefin polymerization and an olefin polymerization catalyst that exhibit excellent sustainability of polymerization activity have been desired, thus ensuring that the polymerization activity can be maintained for a long time when polymerizing a single olefin (e.g., propylene), and can also be maintained for a long time when subjecting two or more olefins to copolymerization or multistep polymerization.

However, when propylene and another α-olefin are copolymerized by a multistep polymerization process using a known catalyst, for example, the polymerization activity significantly decreases during copolymerization in the second or subsequent step when a polymer having high stereoregularity is produced by first-step propylene polymerization (homopolymerization).

In view of the above situation, an object of the invention is to provide a method for producing a novel solid catalyst component for olefin polymerization that achieves excellent olefin polymerization activity and the higher hydrogen response during polymerization when homopolymerizing or copolymerizing an olefin, and can produce an olefin polymer that exhibits a high MFR, high stereoregularity, and excellent rigidity while achieving high sustainability of polymerization activity, and also provide an olefin polymerization catalyst and a method for producing an olefin polymer.

Solution to Problem

The inventors conducted extensive studies in order to achieve the above object, and found that the above object can be achieved by producing a solid catalyst component for olefin polymerization by performing a first step that brings a magnesium compound, a tetravalent titanium halide compound, and a specific first internal electron donor compound into contact with each other to effect a reaction, followed by washing, a second step that brings a tetravalent titanium halide compound and one or more second internal electron donor compounds into contact with a product obtained by the first step to effect a reaction, followed by washing, and a third step that brings one or more third internal electron donor compounds into contact with a product obtained by the second step to effect a reaction, preparing an olefin polymerization catalyst using the solid catalyst component, and reacting an olefin using the olefin polymerization catalyst. This finding has led to the completion of the invention.

Several aspects of the invention provide the following.

(1) A method for producing a solid catalyst component for olefin polymerization including:

a first step that brings a magnesium compound, a tetravalent titanium halide compound, and one or more first internal electron donor compounds excluding an aromatic dicarboxylic acid diester into contact with each other to effect a reaction, followed by washing;

a second step that brings a tetravalent titanium halide compound and one or more second internal electron donor compounds into contact with a product obtained by the first step to effect a reaction, followed by washing; and a third step that brings one or more third internal electron donor compounds into contact with a product obtained by the second step to effect a reaction.

(2) The method for producing a solid catalyst component for olefin polymerization according to (1), wherein the first internal electron donor compound is one or more compounds selected from an aliphatic polycarboxylic acid ester, an alicyclic polycarboxylic acid ester, and an ether compound.

(3) The method for producing a solid catalyst component for olefin polymerization according to (1) or (2), wherein the second internal electron donor compound is used so that the ratio "molar quantity of the second internal electron donor compound/molar quantity of the magnesium compound" is 0.001 to 10.

(4) The method for producing a solid catalyst component for olefin polymerization according to any one of (1) to (3), wherein the third internal electron donor compound is used so that the ratio "molar quantity of the third internal electron donor compound/molar quantity of the magnesium compound" is 0.001 to 10.

(5) The method for producing a solid catalyst component for olefin polymerization according to any one of (1) to (4), wherein the first internal electron donor compound, the second internal electron donor compound, and the third internal electron donor compound are used so that the relationship "molar quantity of the first internal electron donor compound>molar quantity of the second internal electron compound≥molar quantity of the third internal electron donor compound" is satisfied.

(6) The method for producing a solid catalyst component for olefin polymerization according to any one of (1) to (5), wherein the third internal electron donor compound is brought into contact with the product obtained by the second step in an inert organic solvent for which a tetravalent titanium halide compound content is controlled to 0 to 5 mass %.

(7) An olefin polymerization catalyst produced by bringing a solid catalyst component for olefin polymerization obtained by the method for producing a solid catalyst component for olefin polymerization according to any one of (1) to (6), an organoaluminum compound represented by the following general formula (I), and an external electron donor compound into contact with each other,

$$R^1_p AlQ_{3-p} \quad (I)$$

wherein $R^1$ is an alkyl group having 1 to 6 carbon atoms, Q is a hydrogen atom or a halogen atom, and p is a real number that satisfies $0<p\leq 3$.

(8) The olefin polymerization catalyst according to (8), wherein the external electron donor compound is one or more organosilicon compounds selected from an organosilicon compound represented by the following general formula (II) and an organosilicon compound represented by the following general formula (III),

$$R^2_q Si(OR^3)_{4-q} \quad (II)$$

wherein $R^2$ is an alkyl group having 1 to 12 carbon atoms, a cycloalkyl group having 3 to 12 carbon atoms, a phenyl group, a vinyl group, an allyl group, or an aralkyl group, provided that a plurality of $R^2$ are either identical or different when a plurality of $R^2$ are present, $R^3$ is an alkyl group having 1 to 4 carbon atoms, a cycloalkyl group having 3 to 6 carbon atoms, a phenyl group, a vinyl group, an allyl group, or an aralkyl group, provided that a plurality of $R^3$ are either identical or different when a plurality of $R^3$ are present, and q is an integer from 0 to 3,

$$(R^4 R^5 N)_s SiR^6_{(4-s)} \quad (III)$$

wherein $R^4$ and $R^5$ are a hydrogen atom, a linear alkyl group having 1 to 20 carbon atoms, a branched alkyl group having 3 to 20 carbon atoms, a vinyl group, an allyl group, an aralkyl group, a cycloalkyl group having 3 to 20 carbon atoms, or an aryl group, provided that $R^4$ and $R^5$ are either identical or different, and optionally bond to each other to form a ring, $R^6$ is a linear alkyl group having 1 to 20 carbon atoms, a branched alkyl group having 3 to 20 carbon atoms, a vinyl group, an allyl group, an aralkyl group, a linear or branched alkoxy group having 1 to 20 carbon atoms, a vinyloxy group, an allyloxy group, a cycloalkyl group having 3 to 20 carbon atoms, an aryl group, or an aryloxy group, provided that a plurality of $R^6$ are either identical or different when a plurality of $R^6$ are present, and s is an integer from 1 to 3.

(9) A method for producing an olefin polymer including polymerizing an olefin in the presence of the olefin polymerization catalyst according to (7) or (8).

In particular, several aspects of the invention provide the following.

(1)' A method for producing a solid catalyst component for olefin polymerization including:

a first step that brings a magnesium compound, a tetravalent titanium halide compound, and one or more first internal electron donor compounds excluding an aromatic dicarboxylic acid diester into contact with each other to effect a reaction, followed by washing;

a second step that brings a tetravalent titanium halide compound and one or more second internal electron donor compounds into contact with a product obtained by 8 the first step to effect a reaction, followed by washing; and a third step that brings one or more third internal electron donor compounds into contact with a product obtained by the second step to effect a reaction.

(2)' The method for producing a solid catalyst component for olefin polymerization according to (1)', wherein the first internal electron donor compound is one or more compounds selected from an aliphatic polycarboxylic acid ester, an alicyclic polycarboxylic acid ester, and an ether compound.

(3)' The method for producing a solid catalyst component for olefin polymerization according to (1)', wherein the second internal electron donor compound is used so that the ratio "molar quantity of the second internal electron donor compound/molar quantity of the magnesium compound" is 0.001 to 10.

(4)' The method for producing a solid catalyst component for olefin polymerization according to (1)', wherein the third internal electron donor compound is used so that the ratio "molar quantity of the third internal electron donor compound/molar quantity of the magnesium compound" is 0.001 to 10.

(5)' The method for producing a solid catalyst component for olefin polymerization according to (1)', wherein the first internal electron donor compound, the second internal electron donor compound, and the third internal electron donor compound are used so that the relationship "molar quantity of the first internal electron donor compound>molar quantity of the second internal electron donor compound≥molar quantity of the third internal electron donor compound" is satisfied.

(6)' The method for producing a solid catalyst component for olefin polymerization according to (1)', wherein the third internal electron donor compound is brought into contact with the product obtained by the second step in an inert organic solvent for which a tetravalent titanium halide compound content is controlled to 0 to 5 mass %.

(7)' An olefin polymerization catalyst produced by bringing a solid catalyst component for olefin polymerization obtained by the method for producing a solid catalyst component for olefin polymerization according to any one of (1)' to (6)', an organoaluminum compound represented by the following general formula (I), and an external electron donor compound into contact with each other,

$$R^1_p AlQ_{3-p} \quad (I)$$

wherein $R^1$ is an alkyl group having 1 to 6 carbon atoms, Q is a hydrogen atom or a halogen atom, and p is a real number that satisfies $0<p\leq 3$.

(8)' The olefin polymerization catalyst according to (7)', wherein the external electron donor compound is one or more organosilicon compounds selected from an organosilicon compound represented by the following general formula (II) and an organosilicon compound represented by the following general formula (III),

$$R^2_q Si(OR^3)_{4-q} \quad (II)$$

wherein $R^2$ is an alkyl group having 1 to 12 carbon atoms, a cycloalkyl group having 3 to 12 carbon atoms, a phenyl group, a vinyl group, an allyl group, or an aralkyl group, provided that a plurality of $R^2$ are either identical or different when a plurality of $R^2$ are present, $R^3$ is an alkyl group having 1 to 4 carbon atoms, a cycloalkyl group having 3 to 6 carbon atoms, a phenyl group, a vinyl group, an allyl group, or an aralkyl group, provided that a plurality of $R^3$ are either identical or different when a plurality of $R^3$ are present, and q is an integer from 0 to 3,

$$(R^4R^5N)_s SiR^6_{(4-s)} \quad (III)$$

wherein $R^4$ and $R^5$ are a hydrogen atom, a linear alkyl group having 1 to 20 carbon atoms, a branched alkyl group having 3 to 20 carbon atoms, a vinyl group, an allyl group, an aralkyl group, a cycloalkyl group having 3 to 20 carbon atoms, or an aryl group, provided that $R^4$ and $R^5$ are either identical or different, and optionally bond to each other to form a ring, $R^6$ is a linear alkyl group having 1 to 20 carbon atoms, a branched alkyl group having 3 to 20 carbon atoms, a vinyl group, an allyl group, an aralkyl group, a linear or branched alkoxy group having 1 to 20 carbon atoms, a vinyloxy group, an allyloxy group, a cycloalkyl group having 3 to 20 carbon atoms, an aryl group, or an aryloxy group, provided that a plurality of $R^6$ are either identical or different when a plurality of $R^6$ are present, and s is an integer from 1 to 3.

(9)' A method for producing an olefin polymer including polymerizing an olefin in the presence of the olefin polymerization catalyst according to (7)'.

(10)' A method for producing an olefin polymer including polymerizing an olefin in the presence of the olefin polymerization catalyst according to (8)'.

Advantageous Effects of the Invention

The aspects of the invention thus provide a method for producing a novel solid catalyst component for olefin polymerization that achieves excellent olefin polymerization activity and the higher hydrogen response during polymerization when homopolymerizing or copolymerizing an olefin, and can produce an olefin polymer that exhibits a high MFR, high stereoregularity, and excellent rigidity while achieving high sustainability of polymerization activity, and also provide an olefin polymerization catalyst and a method for producing an olefin polymer.

DESCRIPTION OF EMBODIMENTS

A method for producing a solid catalyst component for olefin polymerization (hereinafter may be referred to as "production method") according to one embodiment of the invention is described below.

The method for producing a solid catalyst component for olefin polymerization according to one embodiment of the invention includes: a first step that brings a magnesium compound, a tetravalent titanium halide compound, and one or more first internal electron donor compounds excluding an aromatic dicarboxylic acid diester into contact with each other to effect a reaction, followed by washing; a second step that brings a tetravalent titanium halide compound and one or more second internal electron donor compounds into contact with a product obtained by the first step to effect a reaction, followed by washing; and a third step that brings one or more third internal electron donor compounds into contact with a product obtained by the second step to effect a reaction.

First Step

The magnesium compound used in connection with the method for producing a solid catalyst component for olefin polymerization according to one embodiment of the invention may be one or more magnesium compounds selected from a dialkoxymagnesium, a magnesium dihalide, an alkoxymagnesium halide, and the like.

Among these magnesium compounds, a dialkoxymagnesium and a magnesium dihalide are preferable. Specific examples of the dialkoxymagnesium and the magnesium dihalide include dimethoxymagnesium, diethoxymagnesium, dipropoxymagnesium, dibutoxymagnesium, ethoxymethoxymagnesium, ethoxypropoxymagnesium, butoxyethoxymagnesium, magnesium dichloride, magnesium dibromide, magnesium diiodide, and the like. Among these, diethoxymagnesium and magnesium dichloride are particularly preferable.

The dialkoxymagnesium may be a dialkoxymagnesium obtained by reacting magnesium metal with an alcohol in the presence of a halogen, a halogen-containing metal compound, or the like.

It is preferable to use a granular or powdery dialkoxymagnesium when implementing the method for producing a solid catalyst component for olefin polymerization according to one embodiment of the invention. The dialkoxymagnesium may have an indefinite shape or a spherical shape.

When a spherical dialkoxymagnesium is used, the resulting polymer powder has a better (more spherical) particle shape and a narrower particle size distribution. This makes it possible to improve the handling capability of the polymer powder produced during polymerization, and eliminate occurrence of a problem (e.g., clogging) due to a fine powder included in the polymer powder.

The spherical dialkoxymagnesium need not necessarily have a perfect spherical shape, but may have an elliptical shape or a potato-like shape. It is preferable that the dialkoxymagnesium particles have a sphericity of 3 or less, more preferably 1 to 2, and still more preferably 1 to 1.5.

Note that the term "sphericity" used herein in connection with the dialkoxymagnesium particles refers to a value obtained by photographing 500 or more dialkoxymagnesium particles using a scanning electron microscope, processing the photographed particles using image analysis software to determine the area S and the circumferential length L of each dialkoxymagnesium particle, calculating the sphericity of each dialkoxymagnesium particle using the following expression, and calculating the arithmetic mean value thereof. The sphericity is close to 1 when the shape of the particle is close to a true circle.

$$\text{Sphericity of each dialkoxymagnesium } 4\pi \times S \div L^2$$

The average particle size D50 (i.e., the particle size at 50% in the cumulative volume particle size distribution) of the dialkoxymagnesium measured using a laser diffraction/scattering particle size distribution analyzer is preferably 1 to 200 μm, and more preferably 5 to 150 μm.

The average particle size of the spherical dialkoxymagnesium is preferably 1 to 100 μm, more preferably 5 to 60 μm, and still more preferably 10 to 50 μm.

It is preferable that the dialkoxymagnesium have a narrow particle size distribution, and have a low fine particle content and a low coarse particle content.

More specifically, it is preferable that the dialkoxymagnesium have a content of particles having a particle size (measured using a laser diffraction/scattering particle size distribution analyzer) equal to or smaller than 5 μm of 20% or less, and more preferably 10% or less. It is preferable that the dialkoxymagnesium have a content of particles having a particle size (measured using a laser diffraction/scattering particle size distribution analyzer) equal to or larger than 100 μm of 10% or less, and more preferably 5% or less.

The particle size distribution ln(D90/D10) (where, D90 is the particle size at 90% in the cumulative volume particle size distribution, and D10 is the particle size at 10% in the cumulative volume particle size distribution) of the spherical dialkoxymagnesium is preferably 3 or less, and more preferably 2 or less.

The spherical dialkoxymagnesium may be produced using the method disclosed in JP-A-58-41832, JP-A-62-51633, JP-A-3-74341, JP-A-4-368391, JP-A-8-73388, or the like.

When implementing the method for producing a solid catalyst component for olefin polymerization according to one embodiment of the invention, it is preferable that the magnesium compound be used in the form of a solution or a suspension when subjected to the reaction. When the magnesium compound is used in the form of a solution or a suspension, the reaction proceeds advantageously.

When the magnesium compound is solid, the magnesium compound may be dissolved in a solvent that can dissolve the magnesium compound to prepare a magnesium compound solution, or may be suspended in a solvent that cannot dissolve the magnesium compound to prepare a magnesium compound suspension.

When the magnesium compound is liquid, the magnesium compound may be used directly, or may be dissolved in a solvent that can dissolve the magnesium compound to prepare a magnesium compound solution.

Examples of a compound that can dissolve the solid magnesium compound include at least one compound selected from the group consisting of an alcohol, an ether, and an ester.

Specific examples of the compound that can dissolve the solid magnesium compound include alcohols having 1 to 18 carbon atoms, such as methanol, ethanol, propanol, butanol, pentanol, hexanol, 2-ethylhexanol, octanol, dodecanol, octadecyl alcohol, oleyl alcohol, benzyl alcohol, phenylethyl alcohol, cumyl alcohol, isopropyl alcohol, isopropylbenzyl alcohol, and ethylene glycol, halogen-containing alcohols having 1 to 18 carbon atoms, such as trichloromethanol, trichloroethanol, and trichlorohexanol, ethers having 2 to 20 carbon atoms, such as methyl ether, ethyl ether, isopropyl ether, butyl ether, amyl ether, tetrahydrofuran, ethyl benzyl ether, dibutyl ether, anisole, and diphenyl ether, metal acid esters such as tetraethoxytitanium, tetra-n-propoxytitanium, tetraisopropoxytitanium, tetrabutoxytitanium, tetrahexoxytitanium, tetrabutoxyzirconium, and tetraethoxyzirconium, and the like. Among these, alcohols such as ethanol, propanol, butanol, and 2-ethylhexanol are preferable, and 2-ethylhexanol is particularly preferable.

Examples of a medium that cannot dissolve the solid magnesium compound include one or more solvents selected from a saturated hydrocarbon solvent and an unsaturated hydrocarbon solvent that do not dissolve a magnesium compound.

The saturated hydrocarbon solvent and the unsaturated hydrocarbon solvent are safe, and have high industrial versatility. Examples of the saturated hydrocarbon solvent and the unsaturated hydrocarbon solvent include linear or branched aliphatic hydrocarbon compounds having a boiling point of 50 to 200° C., such as hexane, heptane, decane, and methylheptane, alicyclic hydrocarbon compounds having a boiling point of 50 to 200° C., such as cyclohexane, ethylcyclohexane, and decahydronaphthalene, and aromatic hydrocarbon compounds having a boiling point of 50 to 200° C., such as toluene, xylene, and ethylbenzene. Among these, linear aliphatic hydrocarbon compounds having a boiling point of 50 to 200° C., such as hexane, heptane, and decane, and aromatic hydrocarbon compounds having a boiling point of 50 to 200° C., such as toluene, xylene, and ethylbenzene, are preferable.

The tetravalent titanium halide compound used in the first step included in the method for producing a solid catalyst component for olefin polymerization according to one embodiment of the invention is not particularly limited, but is preferably one or more compounds selected from a titanium halide and an alkoxytitanium halide represented by the following general formula (IV).

$$\text{Ti}(\text{OR}^7)_r X_{(4-r)} \qquad (IV)$$

wherein $R^7$ is an alkyl group having 1 to 4 carbon atoms, X is a halogen atom (e.g., chlorine atom, bromine atom, or iodine atom), and r is an integer from 0 to 3.

Examples of the titanium halide include titanium tetrahalides such as titanium tetrachloride, titanium tetrabromide, and titanium tetraiodide.

Examples of the alkoxytitanium halide include methoxytitanium trichloride, ethoxytitanium trichloride, propoxytitanium trichloride, n-butoxytitanium trichloride, dimethoxytitanium dichloride, diethoxytitanium dichloride, dipropoxytitanium dichloride, di-n-butoxytitanium dichloride, trimethoxytitanium chloride, triethoxytitanium chloride, tripropoxytitanium chloride, tri-n-butoxytitanium chloride, and the like.

Among these, titanium tetrahalides are preferable, and titanium tetrachloride is more preferable.

These titanium compounds may be used either alone or in combination.

One or more first internal electron donor compounds excluding an aromatic dicarboxylic acid diester are used in the first step included in the method for producing a solid catalyst component for olefin polymerization according to one embodiment of the invention.

The first internal electron donor compound is preferably an organic compound that includes an oxygen atom or nitrogen atom. The first internal electron donor compound may be one or more compounds selected from an alcohol, a phenol, an ether, an ester excluding an aromatic dicarboxylic acid diester, a ketone, an acid halide, an aldehyde, an amine, an amide, a nitrile, an isocyanate, an organosilicon compound that includes an Si—O—C linkage or an Si—N—C linkage, and the like.

Note that the aromatic dicarboxylic acid diester that is excluded from the first internal electron donor compound used when implementing the method for producing a solid catalyst component for olefin polymerization according to one embodiment of the invention is represented by the following general formula (V).

$(R^8)_jC_6H_{(4-j)}(COOR^9)(COOR^{10})$ (V)

wherein $R^8$ is an alkyl group having 1 to 8 carbon atoms or a halogen atom, $R^9$ and $R^{10}$ are an alkyl group having 1 to 12 carbon atoms, provided that $R^9$ and $R^{10}$ are either identical or different, and j, which is the number of substituents $R^8$, is 0, 1, or 2, provided that $R^8$ are either identical or different when j is 2.

$R^8$ in the aromatic dicarboxylic acid diester represented by the general formula (I) is a halogen atom or an alkyl group having 1 to 8 carbon atoms.

Examples of the halogen atom represented by $R^8$ include one or more atoms selected from a fluorine atom, a chlorine atom, a bromine atom, and an iodine atom.

Examples of the alkyl group having 1 to 8 carbon atoms represented by $R^8$ include one or more groups selected from a methyl group, an ethyl group, an n-propyl group, an isopropyl group, an n-butyl group, an isobutyl group, a t-butyl group, an n-pentyl group, an isopentyl group, a neopentyl group, an n-hexyl group, an isohexyl group, a 2,2-dimethylbutyl group, a 2,2-dimethylpentyl group, an isooctyl group, and a 2,2-dimethylhexyl group.

$R^9$ and $R^{10}$ in the aromatic dicarboxylic acid diester represented by the general formula (V) are an alkyl group having 1 to 12 carbon atoms, provided that $R^9$ and $R^{10}$ are either identical or different.

Examples of the alkyl group having 1 to 12 carbon atoms include a methyl group, an ethyl group, a n-propyl group, an isopropyl group, a n-butyl group, an isobutyl group, a t-butyl group, a n-pentyl group, an isopentyl group, a neopentyl group, a n-hexyl group, an isohexyl group, a 2,2-dimethylbutyl group, a 2,2-dimethylpentyl group, an isooctyl group, a 2,2-dimethylhexyl group, a n-nonyl group, an isononyl group, a n-decyl group, an isodecyl group, and a n-dodecyl group. Among these, an ethyl group, a n-propyl group, a n-butyl group, an isobutyl group, a t-butyl group, a neopentyl group, an isohexyl group, and an isooctyl group (particularly an ethyl group, an n-propyl group, an n-butyl group, an isobutyl group, and a neopentyl group) are preferable.

j (i.e., the number of substituents $R^8$) in the aromatic dicarboxylic acid diester represented by the general formula (V) is 0, 1, or 2, provided that $R^8$ (two $R^8$) are either identical or different when j is 2.

The compound represented by the general formula (I) is a phthalic acid diester when j is 0, and is a substituted phthalic acid diester when j is 1 or 2.

Specific examples of the aromatic dicarboxylic acid diester represented by the general formula (V) include phthalic acid diesters such as dimethyl phthalate, diethyl phthalate, di-n-propyl phthalate, diisopropyl phthalate, di-n-butyl phthalate, diisobutyl phthalate, di-n-pentyl phthalate, diisopentyl phthalate, dineopentyl phthalate, di-n-hexyl phthalate, dithexyl phthalate, methylethyl phthalate, (ethyl) n-propyl phthalate, ethylisopropyl phthalate, (ethyl)n-butyl phthalate, ethylisobutyl phthalate, (ethyl)n-pentyl phthalate, ethylisopentyl phthalate, ethylneopentyl phthalate, and (ethyl)n-hexyl phthalate, halogen-substituted phthalic acid diesters such as diethyl 4-chlorophthalate, di-n-propyl 4-chlorophthalate, diisopropyl 4-chlorophthalate, di-n-butyl 4-chlorophthalate, diisobutyl 4-chlorophthalate, diethyl 4-bromophthalate, di-n-propyl 4-bromophthalate, diisopropyl 4-bromophthalate, di-n-butyl 4-bromophthalate, and diisobutyl 4-bromophthalate, alkyl-substituted phthalic acid diesters such as diethyl 4-methylphthalate, di-n-propyl 4-methylphthalate, diisopropyl 4-methylphthalate, di-n-butyl 4-methylphthalate, and diisobutyl 4-methylphthalate, and the like.

An ether compound (e.g., monoether, diether, and ether carbonate) and an ester (e.g., monocarboxylic acid ester, and polycarboxylic acid ester excluding an aromatic polycarboxylic acid ester) are more preferable as the first internal electron donor compound. The first internal electron donor compound is still more preferably one or more compounds selected from an aliphatic polycarboxylic acid ester, an alicyclic polycarboxylic acid ester, a diether, and an ether carbonate.

Examples of the aliphatic polycarboxylic acid ester include a saturated aliphatic polycarboxylic acid ester and an unsaturated aliphatic polycarboxylic acid ester.

Examples of the saturated aliphatic polycarboxylic acid ester include a malonic acid diester, a succinic acid diester, a fumaric acid diester, an adipic acid diester, a glutaric acid diester, and the like. The saturated aliphatic polycarboxylic acid ester is preferably one compound, or two or more compounds, selected from a malonic acid diester, an alkyl-substituted malonic acid diester, an alkylene-substituted malonic acid diester, and a succinic acid diester.

Examples of the unsaturated aliphatic polycarboxylic acid ester include a maleic acid diester and the like. The unsaturated aliphatic polycarboxylic acid ester is preferably one compound, or two or more compounds, selected from a maleic acid diester and an alkyl-substituted maleic acid diester.

Examples of the succinic acid diester that may be used as the first internal electron donor compound include diethyl succinate, dibutyl succinate, diethyl methylsuccinate, diethyl 2,3-diisopropylsuccinate, and the like. Among these, diethyl succinate and diethyl 2,3-diisopropylsuccinate are preferable.

Examples of the maleic acid diester that may be used as the first internal electron donor compound include diethyl maleate, di-n-propyl maleate, diisopropyl maleate, di-n-butyl maleate, diisobutyl maleate, di-n-pentyl maleate, dineopentyl maleate, dihexyl maleate, dioctyl maleate, and the like. Among these, diethyl maleate, di-n-butyl maleate, and diisobutyl maleate are preferable.

Examples of the alkyl-substituted maleic acid diester that may be used as the first internal electron donor compound include diethyl isopropylbromomaleate, diethyl butylbromomaleate, diethyl isobutylbromomaleate, diethyl diisopropylmaleate, diethyl dibutylmaleate, diethyl diisobutylmaleate, diethyl diisopentylmaleate, diethyl isopropylisobutylmaleate, dimethyl isopropylisopentylmaleate, diethyl (3-chloro-n-propyl)maleate, diethyl bis(3-bromo-n-propyl)maleate, dibutyl dimethylmaleate, dibutyl diethylmaleate, and the like. Among these, dibutyl dimethylmaleate, dibutyl diethylmaleate, and diethyl diisobutylmaleate are preferable.

Examples of the malonic acid diester that may be used as the first internal electron donor compound include dimethyl malonate, diethyl malonate, di-n-propyl malonate, diisopropyl malonate, di-n-butyl malonate, diisobutyl malonate, dineopentyl malonate, and the like. Among these, dimethyl malonate, diethyl malonate, and diisobutyl malonate are preferable.

A substituted malonic acid diester is preferable as the first internal electron donor compound. Examples of the substituted malonic acid diester that may be used as the first internal electron donor compound include an alkyl-substituted malonic acid diester, a halogen-substituted malonic acid diester, an alkyl halide-substituted malonic acid diester, and the like. Among these, an alkyl-substituted malonic acid diester and a halogen-substituted malonic acid diester are preferable, and an alkyl-substituted malonic acid diester is more preferable.

Examples of the alkyl-substituted malonic acid diester include monoalkylmalonic acid diesters such as dimethyl methylmalonate, diethyl methylmalonate, dipropyl methylmalonate, diisopropyl methylmalonate, dibutyl methylmalonate, diisobutyl methylmalonate, dineopentyl methylmalonate, dimethyl ethylmalonate, diethyl ethylmalonate, dipropyl ethylmalonate, diisopropyl ethylmalonate, dibutyl ethylmalonate, diisobutyl ethylmalonate, dineopentyl ethylmalonate, dimethyl propylmalonate, diethyl isopropylmalonate, dipropyl isopropylmalonate, diisopropyl isopropylmalonate, dibutyl isopropylmalonate, diisobutyl isopropylmalonate, dineopentyl isopropylmalonate, dimethyl isobutylmalonate, diethyl isobutylmalonate, dipropyl isobutylmalonate, diisopropyl isobutylmalonate, dibutyl isobutylmalonate, diisobutyl isobutylmalonate, dineopentyl isobutylmalonate, dimethyl isopentylmalonate, diethyl isopentylmalonate, dipropyl isopentylmalonate, diisopropyl isopentylmalonate, dibutyl isopentylmalonate, diisobutyl isopentylmalonate, and dineopentyl isopentylmalonate, dialkylmalonic acid diesters such as dimethyl cyclopentylmethylmalonate, diethyl cyclopentylmethylmalonate, dipropyl cyclopentylmethylmalonate, diisopropyl cyclopentylmethylmalonate, dibutyl cyclopentylmethylmalonate, diisobutyl cyclopentylmethylmalonate, dineopentyl cyclopentylmethylmalonate, dimethyl cyclopentylethylmalonate, diethyl cyclopentylethylmalonate, dipropyl cyclopentylethylmalonate, diisopropyl cyclopentylethylmalonate, dibutyl cyclopentylethylmalonate, diisobutyl cyclopentylethylmalonate, dineopentyl cyclopentylethylmalonate, dimethyl cyclopentylpropylmalonate, diethyl cyclopentylisopropylmalonate, dipropyl cyclopentylisopropylmalonate, diisopropyl cyclopentylisopropylmalonate, dibutyl cyclopentylisopropylmalonate, diisobutyl cyclopentylisopropylmalonate, dineopentyl cyclopentylisopropylmalonate, dimethyl cyclopentylisobutylmalonate, diethyl cyclopentylisobutylmalonate, dipropyl cyclopentylisobutylmalonate, diisopropyl cyclopentylisobutylmalonate, dibutyl cyclopentylisobutylmalonate, diisobutyl cyclopentylisobutylmalonate, dineopentyl cyclopentylisobutylmalonate, dimethyl cyclopentylisopentylmalonate, diethyl cyclopentylisopentylmalonate, dipropyl cyclopentylisopentylmalonate, diisopropyl cyclopentylisopentylmalonate, dibutyl cyclopentylisopentylmalonate, diisobutyl cyclopentylisopentylmalonate, dineopentyl cyclopentylisopentylmalonate, dimethyl cyclohexylmethylmalonate, diethyl cyclohexylmethylmalonate, dipropyl cyclohexylmethylmalonate, diisopropyl cyclohexylmethylmalonate, dibutyl cyclohexylmethylmalonate, diisobutyl cyclohexylmethylmalonate, dineopentyl cyclohexylmethylmalonate, dimethyl cyclohexylethylmalonate, diethyl cyclohexylethylmalonate, dipropyl cyclohexylethylmalonate, diisopropyl cyclohexylethylmalonate, dibutyl cyclohexylethylmalonate, diisobutyl cyclohexylethylmalonate, dineopentyl cyclohexylethylmalonate, dimethyl cyclohexylpropylmalonate, diethyl cyclohexylisopropylmalonate, dipropyl cyclohexylisopropylmalonate, diisopropyl cyclohexylisopropylmalonate, dibutyl cyclohexylisopropylmalonate, diisobutyl cyclohexylisopropylmalonate, dineopentyl cyclohexylisopropylmalonate, dimethyl cyclohexylisobutylmalonate, diethyl isobutylmalonate, dipropyl cyclohexylisobutylmalonate, diisopropyl cyclohexylisobutylmalonate, dibutyl cyclohexylisobutylmalonate, diisobutyl cyclohexylisobutylmalonate, dineopentyl cyclohexylisobutylmalonate, dimethyl cyclohexylisopentylmalonate, diethyl cyclohexylisopentylmalonate, dipropyl cyclohexylisopentylmalonate, diisopropyl cyclohexylisopentylmalonate, dibutyl cyclohexylisopentylmalonate, diisobutyl cyclohexylisopentylmalonate, dineopentyl cyclohexylisopentylmalonate, dimethyl phenylmethylmalonate, diethyl phenylmethylmalonate, dipropyl phenylmethylmalonate, diisopropyl phenylmethylmalonate, dibutyl phenylmethylmalonate, diisobutyl phenylmethylmalonate, dineopentyl phenylmethylmalonate, dimethyl phenylethylmalonate, diethyl phenylethylmalonate, dipropyl phenylethylmalonate, diisopropyl phenylethylmalonate, dibutyl phenylethylmalonate, diisobutyl phenylethylmalonate, dineopentyl phenylethylmalonate, dimethyl phenylpropylmalonate, diethyl phenylisopropylmalonate, dipropyl phenylisopropylmalonate, diisopropyl phenylisopropylmalonate, dibutyl phenylisopropylmalonate, diisobutyl phenylisopropylmalonate, dineopentyl phenylisopropylmalonate, dimethyl phenylisobutylmalonate, diethyl phenylisobutylmalonate, dipropyl phenylisobutylmalonate, diisopropyl phenylisobutylmalonate, dibutyl phenylisobutylmalonate, diisobutyl phenylisobutylmalonate, dineopentyl phenylisobutylmalonate, dimethyl phenylisopentylmalonate, diethyl phenylisopentylmalonate, dipropyl phenylisopentylmalonate, diisopropyl phenylisopentylmalonate, dibutyl phenylisopentylmalonate, diisobutyl phenylisopentylmalonate, dineopentyl phenylisopentylmalonate, dimethyl diisopropylmalonate, diethyl diisopropylmalonate, dipropyl diisopropylmalonate, diisopropyl diisopropylmalonate, dibutyl diisopropylmalonate, diisobutyl diisopropylmalonate, dineopentyl diisopropylmalonate, dimethyl diisobutylmalonate, diethyl diisobutylmalonate, dipropyl diisobutylmalonate, diisopropyl diisobutylmalonate, dibutyl diisobutylmalonate, diisobutyl diisobutylmalonate, dineopentyl diisobutylmalonate, dimethyl diisopentylmalonate, diethyl diisopentylmalonate, dipropyl diisopentylmalonate, diisopropyl diisopentylmalonate, dibutyl diisopentylmalonate, diisobutyl diisopentylmalonate, dineopentyl diisopentylmalonate, dimethyl isopropylisobutylmalonate, diethyl isopropylisobutylmalonate, dipropyl isopropylisobutylmalonate, diisopropyl isopropylisobutylmalonate, dibutyl isopropylisobutylmalonate, diisobutyl isopropylisobutylmalonate, dineopentyl isopropylisobutylmalonate, dimethyl isopropylisopentylmalonate, diethyl isopropylisopentylmalonate, dipropyl isopropylisopentylmalonate, diisopropyl isopropylisopentylmalonate, dibutyl isopropylisopentylmalonate, diisobutyl isopropylisopentylmalonate, and dineopentyl isopropylisopentylmalonate, and alkylidenemalonic acid diesters such as dimethyl propylidenemalonate, diethyl propylidenemalonate, di-n-propyl propylidenemalonate, diisobutyl propylidenemalonate, di-n-butyl propylidenemalonate, dimethyl butylidenemalonate, diethyl butylidenemalonate, di-n-propyl butylidenemalonate, diisobutyl butylidenemalonate, di-n-butyl butylidenemalonate, dimethyl pentylidenemalonate, diethyl pentylidenemalonate, di-n-propyl pentylidenemalonate, diisobutyl pentylidenemalonate, di-n-butyl pentylidenemalonate, dimethyl hexylidenemalonate, diethyl hexylidenemalonate, di-n-propyl hexylidenemalonate, diisobutyl hexylidenemalonate, di-n-butyl hexylidenemalonate, dimethyl (2-methylpropylidene)malonate, diethyl (2-methylpropylidene)malonate, di-n-propyl (2-methylpropylidene)malonate, diisobutyl (2-methylpropylidene)malonate, di-n-butyl (2-methylpropylidene)malonate, diethyl (2,2-dimethylpropylidene)malonate, dimethyl (2-methylbutylidene)malonate, diethyl (2-methylbutylidene)malonate, di-n-propyl (2-methylbutylidene)malonate, diisobutyl (2-methylbutylidene)malonate, di-n-butyl (2-methylbutylidene)malonate, dimethyl (2-ethylbutylidene)malonate, diethyl (2-ethylbutylidene)malonate, di-n-propyl (2-ethylbutylidene)malonate, diisobutyl (2-ethylbutylidene)malonate, di-n-butyl (2-ethylbutylidene)malonate, dimethyl (2-ethylpentylidene)malonate, diethyl (2-ethylpentylidene)malonate, di-n-propyl (2-ethylpentylidene)malonate, diisobutyl (2-ethylpentylidene)malonate, di-n-butyl (2-ethylpentylidene)malonate, dimethyl (2-isopropylbutylidene)malonate, diethyl (2-isopropylbutylidene)malonate, di-n-propyl (2-isopropylbutylidene)malonate, diisobutyl (2-isopropylbutylidene)malonate, di-n-butyl (2-isopropylbutylidene)malonate, dimethyl (3-methylbutylidene)malonate, diethyl (3-methylbutylidene)malonate, di-n-propyl (3-methylbutylidene)malonate, diisobutyl (3-methylbutylidene)malonate, di-n-butyl (3-methylbutylidene)malonate, dimethyl (2,3-dimethylbutylidene)malonate, diethyl (2,3-dimethylbutylidene)malonate, di-n-propyl (2,3-dimethylbutylidene)malonate, diisobutyl (2,3-dimethylbutylidene)malonate, di-n-butyl (2,3-dimethylbutylidene)malonate, dimethyl (2-n-propylbutylidene)malonate, diethyl (2-n-propylbutylidene)malonate, di-n-propyl (2-n-propylbutylidene)malonate, diisobutyl (2-n-propylbutylidene)malonate, di-n-butyl (2-n-propylbutylidene)malonate, dimethyl (2-isobutyl-3-methylbutylidene)malonate, diethyl (2-isobutyl-3-methylbutylidene)malonate, di-n-propyl (2-isobutyl-3-methylbutylidene)malonate, diisobutyl (2-isobutyl-3-methylbutylidene)malonate, di-n-butyl (2-isobutyl-3-methylbutylidene)malonate, dimethyl (2-n-butylpentylidene)malonate, diethyl (2-n-butylpentylidene)malonate, di-n-propyl (2-n-butylpentylidene)malonate, diisobutyl (2-n-butylpentylidene)malonate, di-n-butyl (2-n-butylpentylidene)malonate, dimethyl (2-n-pentylhexylidene)malonate, diethyl (2-n-pentylhexylidene)malonate, di-n-propyl (2-n-pentylhexylidene)malonate, diisobutyl (2-n-pentylhexylidene)malonate, di-n-butyl (2-n-pentylhexylidene)malonate, dimethyl (cyclohexylmethylene)malonate, diethyl (cyclohexylmethylene)malonate, di-n-propyl (cyclohexylmethylene)malonate, diisobutyl (cyclohexylmethylene)malonate, di-n-butyl (cyclohexylmethylene)malonate, dimethyl (cyclopentylmethylene)malonate, diethyl (cyclopentylmethylene)malonate, di-n-propyl (cyclopentylmethylene)malonate, diisobutyl (cyclopentylmethylene)malonate, di-n-butyl (cyclopentylmethylene)malonate, dimethyl (1-methylpropylidene)malonate, di-n-propyl (1-methylpropylidene)malonate, diisobutyl (1-methylpropylidene)malonate, di-n-butyl (1-methylpropylidene)malonate, diethyl (1-ethylpropylidene)malonate, dimethyl (di-t-butylmethylene)malonate, diethyl (di-t-butylmethylene)malonate, di-n-propyl (di-t-butylmethylene)malonate, diisobutyl (di-t-butylmethylene)malonate, di-n-butyl (di-t-butylmethylene) malonate, dimethyl (diisobutylmethylene)malonate, diethyl (diisobutylmethylene)malonate, di-n-propyl (diisobutylmethylene)malonate, diisobutyl (diisobutylmethylene)malonate, di-n-butyl (diisobutylmethylene)malonate, dimethyl (diisopropylmethylene)malonate, diethyl (diisopropylmethylene)malonate, di-n-propyl (diisopropylmethylene)malonate, diisobutyl (diisopropylmethylene)malonate, di-n-butyl (diisopropylmethylene)malonate, dimethyl (dicyclopentylmethylene)malonate, diethyl (dicyclopentylmethylene)malonate, di-n-propyl (dicyclopentylmethylene)malonate, diisobutyl (dicyclopentylmethylene)malonate, di-n-butyl (dicyclopentylmethylene)malonate, dimethyl (dicyclohexylmethylene)malonate, diethyl (dicyclohexylmethylene)malonate, di-n-propyl (dicyclohexylmethylene)malonate, diisobutyl (dicyclohexylmethylene)malonate, di-n-butyl (dicyclohexylmethylene)malonate, dimethyl benzylidenemalonate, diethyl benzylidenemalonate, di-n-propyl benzylidenemalonate, diisobutyl benzylidenemalonate, di-n-butyl benzylidenemalonate, dimethyl (1-methylbenzylidene)malonate, diethyl (1-methylbenzylidene)malonate, di-n-propyl (1-methylbenzylidene)malonate, diisobutyl (1-methylbenzylidene)malonate, di-n-butyl (1-methylbenzylidene)malonate, dimethyl (1-ethylbenzylidene)malonate, diethyl (1-ethylbenzylidene)malonate, di-n-propyl (1-ethylbenzylidene)malonate, diisobutyl (1-ethylbenzylidene)malonate, di-n-butyl (1-ethylbenzylidene)malonate, dimethyl (1-n-propylbenzylidene)malonate, diethyl (1-n-propylbenzylidene)malonate, di-n-propyl (1-n-propylbenzylidene)malonate, diisobutyl (1-n-propylbenzylidene)malonate, di-n-butyl (1-n-propylbenzylidene)malonate, dimethyl (1-isopropylbenzylidene)malonate, diethyl (1-isopropylbenzylidene)malonate, di-n-propyl (1-isopropylbenzylidene) malonate, diisobutyl (1-isopropylbenzylidene)malonate, di-n-butyl (1-isopropylbenzylidene)malonate, dimethyl (1-n-butylbenzylidene)malonate, diethyl (1-n-butylbenzylidene) malonate, di-n-propyl (1-n-butylbenzylidene)malonate, diisobutyl (1-n-butylbenzylidene)malonate, di-n-butyl (1-n-butylbenzylidene)malonate, dimethyl (1-isobutylbenzylidene)malonate, diethyl (1-isobutylbenzylidene)malonate, di-n-propyl (1-isobutylbenzylidene)malonate, diisobutyl (1-isobutylbenzylidene)malonate, di-n-butyl (1-isobutylbenzylidene)malonate, dimethyl (1-t-butylbenzylidene)malonate, diethyl (1-t-butylbenzylidene)malonate, di-n-propyl (1-t-butylbenzylidene)malonate, diisobutyl (1-t-butylbenzylidene)malonate, di-n-butyl (1-t-butylbenzylidene)malonate, dimethyl (1-n-pentylbenzylidene)malonate, diethyl (1-n-pentylbenzylidene)malonate, di-n-propyl (1-n-pentylbenzylidene)malonate, diisobutyl (1-n-pentylbenzylidene)malonate, di-n-butyl (1-n-pentylbenzylidene)malonate, dimethyl (2-methylphenylmethylene)malonate, diethyl (2-methylphenylmethylene)malonate, di-n-propyl (2-methylphenylmethylene)malonate, diisobutyl (2-methylphenylmethylene)malonate, di-n-butyl (2-methylphenylmethylene)malonate, dimethyl (4-methylphenylmethylene)malonate, dimethyl (2,6-dimethylphenylmethylene)malonate, diethyl (2,6-dimethylphenylmethylene)malonate, di-n-propyl (2,6-dimethylphenylmethylene)malonate, diisobutyl (2,6-dimethylphenylmethylene)malonate, di-n-butyl (2,6-dimethylphenylmethylene)malonate, dimethyl (1-methyl-1-(2-methylphenyl)methylene)malonate, diethyl (1-methyl-1-(2-methylphenyl)methylene)malonate, di-n-propyl (1-methyl-1-(2-methylphenyl)methylene)malonate, diisobutyl (1-methyl-1-(2-methylphenyl)methylene)malonate, di-n-butyl (1-methyl-1-(2-methylphenyl)methylene)malonate, dimethyl (2-methylcyclohexylmethylene)malonate, diethyl (2-methylcyclohexylmethylene)malonate, di-n-propyl (2-methylcyclohexylmethylene)malonate, diisobutyl (2-methylcyclohexylmethylene)malonate, di-n-butyl (2-methylcyclohexylmethylene)malonate, dimethyl (2,6-dimethylcyclohexylmethylene)malonate, diethyl (2,6-dimethylcyclohexylmethylene)malonate, di-n-propyl (2,6-dimethylcyclohexylmethylene)malonate, diisobutyl (2,6-dimethylcyclohexylmethylene)malonate, di-n-butyl (2,6-dimethylcyclohexylmethylene)malonate, dimethyl (1-methyl-1-(2-methylcyclohexyl)methylene)malonate, diethyl (1-methyl-1-(2-methylcyclohexyl)methylene)malonate, di-n-propyl (1-methyl-1-(2-methylcyclohexyl)methylene)malonate, diisobutyl (1-methyl-1-(2-methylcyclohexyl)methylene)malonate, di-n-butyl (1-methyl-1-(2-methylcyclohexyl)methylene)malonate, dimethyl (naphthylmethylene)malonate, diethyl (naphthylmethylene)malonate, di-n-propyl (naphthylmethylene)malonate, diisobutyl (naphthylmethylene)malonate, di-n-butyl (naphthylmethylene)malonate, dimethyl (1-n-hexylbenzylidene)malonate, diethyl (1-n-hexylbenzylidene)malonate, di-n-propyl (1-n-hexylbenzylidene)malonate, diisobutyl (1-n-hexylbenzylidene)malonate, and di-n-butyl (1-n-hexylbenzylidene)malonate.

Among these, dialkylmalonic acid diesters and alkylidenemalonic acid diesters are preferable, and dialkylmalonic acid diesters such as dimethyl ethylcyclopentylmalonate, diethyl ethylcyclopentylmalonate, dimethyl diisobutylmalonate, and diethyl diisobutylmalonate, and alkylidenemalonic acid diesters such as dimethyl benzylidenemalonate and diethyl benzylidenemalonate are more preferable.

Examples of the alicyclic polycarboxylic acid ester include a saturated alicyclic polycarboxylic acid ester and an unsaturated alicyclic polycarboxylic acid ester. Specific examples of the alicyclic polycarboxylic acid ester include a cycloalkanedicarboxylic acid diester, a cycloalkenedicarboxylic acid diester, and the like.

Examples of the cycloalkanedicarboxylic acid diester that may be used as the first internal electron donor compound include a cyclopentane-1,2-dicarboxylic acid diester, a cyclopentane-1,3-dicarboxylic acid diester, a cyclohexane-1,2-dicarboxylic acid diester, a cyclohexane-1,3-dicarboxylic acid diester, a cycloheptane-1,2-dicarboxylic acid diester, a cycloheptane-1,2-dicarboxylic acid diester, a cyclooctane-1,2-dicarboxylic acid diester, a cyclooctane-1,3-dicarboxylic acid diester, a cyclononane-1,2-dicarboxylic acid diester, a cyclononane-1,3-dicarboxylic acid diester, a cyclodecane-1,2-dicarboxylic acid diester, a cyclodecane-1,3-dicarboxylic acid diester, and the like.

Among these, compounds having a cycloalkane-1,2-dicarboxylic acid diester structure, such as diethyl cyclopentane-1,2-dicarboxylate, diisopropyl cyclopentane-1,2-dicarboxylate, diisobutyl cyclopentane-1,2-dicarboxylate, diheptyl cyclopentane-1,2-dicarboxylate, didecyl cyclopentane-1,2-dicarboxylate, di-n-butyl cyclopentane-1,2-dicarboxylate, diethyl cyclohexane-1,2-dicarboxylate, di-n-propyl cyclohexane-1,2-dicarboxylate, diisopropyl cyclohexane-1,2-dicarboxylate, di-n-butyl cyclohexane-1,2-dicarboxylate, diisobutyl cyclohexane-1,2-dicarboxylate, dihexyl cyclohexane-1,2-dicarboxylate, diheptyl cyclohexane-1,2-dicarboxylate, dioctyl cyclohexane-1,2-dicarboxylate, di-2-ethylhexyl cyclohexane-1,2-dicarboxylate, didecyl cyclohexane-1,2-dicarboxylate, diethyl cycloheptane-1,2-dicarboxylate, diisopropyl cycloheptane-1,2-dicarboxylate, diisobutyl cycloheptane-1,2-dicarboxylate, diheptyl cycloheptane-1,2-dicarboxylate, diethyl cyclooctane-1,2-dicarboxylate, and diethyl cyclodecane-1,2-dicarboxylate, are preferable.

Examples of a substituted cycloalkanedicarboxylic acid diester (in which some of the hydrogen atoms of the cycloalkyl group are substituted with an alkyl group or the like) that may be used as the first internal electron donor compound include diethyl 3-methylcyclohexane-1,2-dicarboxylate, diethyl 4-methylcyclohexane-1,2-dicarboxylate, diethyl 5-methylcyclohexane-1,2-dicarboxylate, diethyl 3,6-dimethylcyclohexane-1,2-dicarboxylate, di-n-butyl 3,6-dimethylcyclohexane-1,2-dicarboxylate, and the like.

Examples of the cycloalkenedicarboxylic acid diester that may be used as the first internal electron donor compound include a cyclopentenedicarboxylic acid diester, a cyclohexenedicarboxylic acid diester, a cycloheptenedicarboxylic acid diester, a cyclooctenedicarboxylic acid diester, a cyclodecenedicarboxylic acid diester, a biphenyldicarboxylic acid diester, and the like. Specific examples of the cycloalkenedicarboxylic acid diester include 1-cyclohexene-1,2-dicarboxylic acid diesters such as dimethyl 1-cyclohexene-1,2-dicarboxylate, diethyl 1-cyclohexene-1,2-dicarboxylate, di-n-propyl 1-cyclohexene-1,2-dicarboxylate, diisopropyl 1-cyclohexene-1,2-dicarboxylate, di-n-butyl 1-cyclohexene-1,2-dicarboxylate, diisobutyl 1-cyclohexene-1,2-dicarboxylate, dihexyl 1-cyclohexene-1,2-dicarboxylate, diheptyl 1-cyclohexene-1,2-dicarboxylate, dioctyl 1-cyclohexene-1,2-dicarboxylate, didecyl 1-cyclohexene-1,2-dicarboxylate, diethyl 1-cyclohexene-1,3-dicarboxylate, and diisobutyl 1-cyclohexene-1,3-dicarboxylate, 4-cyclohexene-1,2-dicarboxylic acid diesters such as dimethyl 4-cyclohexene-1,2-dicarboxylate, diethyl 4-cyclohexene-1,2-dicarboxylate, di-n-propyl 4-cyclohexene-1,2-dicarboxylate, diisopropyl 4-cyclohexene-1,2-dicarboxylate, di-n-butyl 4-cyclohexene-1,2-dicarboxylate, diisobutyl 4-cyclohexene-1,2-dicarboxylate, dihexyl 4-cyclohexene-1,2-dicarboxylate, diheptyl 4-cyclohexene-1,2-dicarboxylate, dioctyl 4-cyclohexene-1,2-dicarboxylate, didecyl 4-cyclohexene-1,2-dicarboxylate, diethyl 4-cyclohexene-1,3-dicarboxylate, and diisobutyl 4-cyclohexene-1,3-dicarboxylate, 3-cyclopentene-1,2-dicarboxylic acid diesters such as diethyl 3-cyclopentene-1,2-dicarboxylate, diisopropyl 3-cyclopentene-1,2-dicarboxylate, diisobutyl 3-cyclopentene-1,2-dicarboxylate, and diheptyl 3-cyclopentene-1,2-dicarboxylate, 3-cyclopentene-1,3-dicarboxylic acid diesters such as didecyl 3-cyclopentene-1,2-dicarboxylate, diethyl 3-cyclopentene-1,3-dicarboxylate, and diisobutyl 3-cyclopentene-1,3-dicarboxylate, 4-cycloheptene-1,2-dicarboxylic acid diesters such as diethyl 4-cycloheptene-1,2-dicarboxylate, diisopropyl 4-cycloheptene-1,2-dicarboxylate, diisobutyl 4-cycloheptene-1,2-dicarboxylate, diheptyl 4-cycloheptene-1,2-dicarboxylate, and didecyl 4-cycloheptene-1,2-dicarboxylate, diethyl 4-cycloheptene-1,3-dicarboxylate, diisobutyl 4-cycloheptene-1,3-dicarboxylate, diethyl 5-cyclooctene-1,2-dicarboxylate, diethyl 6-cyclodecene-1,2-dicarboxylate, and the like. It is preferable to use one or more compounds selected from 1-cyclohexene-1,2-dicarboxylic acid diesters and 4-cyclohexene-1,2-dicarboxylic acid diesters.

Examples of the diether that may be used as the first internal electron donor compound include a compound represented by the following general formula (VI).

$$R^{11}{}_kH_{(3-k)}C-O-(CR^{12}R^{13})_m-O-CR^{14}{}_nH_{(3-n)} \quad (VI)$$

wherein $R^{11}$ and $R^{14}$ are a halogen atom or an organic group having 1 to 20 carbon atoms, provided that $R^{11}$ and $R^{14}$ are either identical or different, and $R^{12}$ and $R^{13}$ are a hydrogen atom, an oxygen atom, a sulfur atom, a halogen atom, or an organic group having 1 to 20 carbon atoms, provided that $R^{12}$ and $R^{13}$ are either identical or different. The organic group having 1 to 20 carbon atoms may include at least one atom selected from an oxygen atom, a fluorine atom, a chlorine atom, a bromine atom, an iodine atom, a nitrogen atom, a sulfur atom, a phosphorus atom, and a boron atom. When a plurality of organic groups having 1 to 20 carbon atoms are present, the plurality of organic groups may bond to each other to form a ring. k is an integer from 0 to 3. When k is an integer equal to or larger than 2, a plurality of $R^{11}$ are either identical or different. m is an integer from 1 to 10. When m is an integer equal to or larger than 2, a plurality of $R^{12}$ are either identical or different, and a plurality of $R^{13}$ are either identical or different. n is an integer from 0 to 3. When n is an integer equal to or larger than 2, a plurality of $R^{14}$ are either identical or different.

When $R^{11}$ or $R^{14}$ in the compound represented by the general formula (VI) is a halogen atom, the halogen atom may be a fluorine atom, a chlorine atom, a bromine atom, or an iodine atom, for example. The halogen atom is preferably a fluorine atom, a chlorine atom, or a bromine atom.

Examples of the organic group having 1 to 20 carbon atoms represented by $R^{11}$ or $R^{14}$ include a methyl group, an ethyl group, an isopropyl group, an isobutyl group, an n-propyl group, an n-butyl group, a t-butyl group, a hexyl group, an octyl group, a cyclopentyl group, a cyclohexyl group, and a phenyl group. Among these, a methyl group and an ethyl group are preferable.

When the compound represented by the general formula (VI) includes a plurality of organic groups having 1 to 20 carbon atoms, the plurality of organic groups may bond to each other to form a ring. In this case, (1) $R^{11}$ and $R^{11}$ (when k is equal to or larger than 2), (2) $R^{14}$ and $R^{14}$ (when n is equal to or larger than 2), (3) $R^{12}$ and $R^{12}$ (when m is equal to or larger than 2), (4) $R^{13}$ and $R^{13}$ (when m is equal to or larger than 2), (5) $R^{11}$ and $R^{12}$, (6) $R^{11}$ and $R^{13}$, (7) $R^{11}$ and $R^{14}$, (8) $R^{12}$ and $R^{13}$, (9) $R^{12}$ and $R^{14}$, or (10) $R^{13}$ and $R^{14}$ may bond to each other to form a ring. It is preferable that $R^{12}$ and $R^{13}$ (see (8)) bond to each other to form a ring. It is more preferable that $R^{12}$ and $R^{13}$ bond to each other to form a fluorene ring or the like.

Specific examples of the compound represented by the general formula (VI) include 2-isopropyl-2-isobutyl-1,3-dimethoxypropane, 2,2-diisobutyl-1,3-dimethoxypropane, 2-isopropyl-2-isopentyl-1,3-dimethoxypropane, 2,2-dicyclohexyl-1,3-dimethoxypropane, 2,2-bis(cyclohexylmethyl)-1,3-dimethoxypropane, 9,9-bis(methoxymethyl)fluorene, 9,9-bis(ethoxymethyl)fluorene, 9-methoxy-9-ethoxymethylfluorene, 9,9-bis(methoxymethyl)-2,7-dimethylfluorene, 9,9-bis(methoxymethyl)-2,6-diisopropylfluorene, 9,9-bis(methoxymethyl)-3,6-diisobutylfluorene, 9,9-bis(methoxymethyl)-2-isobutyl-7-isopropylfluorene, 9,9-bis(methoxymethyl)-2,7-dichlorofluorene, 9,9-bis(methoxymethyl)-2-chloro-7-isopropylfluorene, and the like. Among these, 2,2-diisobutyl-1,3-dimethoxypropane, 2-isopropyl-2-isobutyl-1,3-dimethoxypropane, 2-isopropyl-2-isopentyl-1,3-dimethoxypropane, 3,3-bis(methoxymethyl)-2,6-dimethylheptane, 9,9-bis(methoxymethyl)fluorene, and the like are preferable, and one compound, or two or more compounds, selected from 2,2-diisobutyl-1,3-dimethoxypropane, 2-isopropyl-2-isopentyl-1,3-dimethoxypropane, 3,3-bis(methoxymethyl)-2,6-dimethylheptane, 9,9-bis(methoxymethyl)fluorene are more preferable. The compound represented by the general formula (VI) is particularly preferably 2-isopropyl-2-isobutyl-1,3-dimethoxypropane, 2-isopropyl-2-isopentyl-1,3-dimethoxypropane, or 9,9-bis(methoxymethyl)fluorene.

k in the compound represented by the general formula (VI) is an integer from 0 to 3, preferably an integer from 0 to 2, and more preferably 0 or 1. When k is an integer equal to or larger than 2, a plurality of $R^{11}$ are either identical or different.

m in the compound represented by the general formula (VI) is an integer from 1 to 10, preferably an integer from 1 to 8, and more preferably an integer from 1 to 6. When m is an integer equal to or larger than 2, a plurality of $R^{12}$ are either identical or different, and a plurality of $R^{13}$ are either identical or different.

n in the compound represented by the general formula (VI) is an integer from 0 to 3, preferably an integer from 0 to 2, and more preferably 0 or 1. When n is an integer equal to or larger than 2, a plurality of $R^{14}$ are either identical or different.

Examples of the ether carbonate that may be used as the first internal electron donor compound include a compound represented by the following general formula (VII).

$$R^{15}-O-C(=O)-O-Z-OR^{16} \quad (VII)$$

wherein $R^{15}$ and $R^{16}$ are a linear alkyl group having 1 to 20 carbon atoms, a branched alkyl group having 3 to 20 carbon atoms, a vinyl group, a linear or branched alkenyl group having 3 to 20 carbon atoms, a linear halogen-substituted alkyl group having 1 to 20 carbon atoms, a branched halogen-substituted alkyl group having 3 to 20 carbon atoms, a linear halogen-substituted alkenyl group having 2 to 20 carbon atoms, a branched halogen-substituted alkenyl group having 3 to 20 carbon atoms, a cycloalkyl group having 3 to 20 carbon atoms, a cycloalkenyl group having 3 to 20 carbon atoms, a halogen-substituted cycloalkyl group having 3 to 20 carbon atoms, a halogen-substituted cycloalkenyl group having 3 to 20 carbon atoms, an aromatic hydrocarbon group having 6 to 24 carbon atoms, a halogen-substituted aromatic hydrocarbon group having 6 to 24 carbon atoms, a nitrogen atom-containing hydrocarbon group having 2 to 24 carbon atoms that is terminated by a carbon atom (provided that a group that is terminated by a C=N group is excluded), an oxygen atom-containing hydrocarbon group having 2 to 24 carbon atoms that is terminated by a carbon atom (provided that a group that is terminated by a carbonyl group is excluded), or a phosphorus-containing hydrocarbon group having 2 to 24 carbon atoms that is terminated by a carbon atom (provided that a group that is terminated by a C=P group is excluded), provided that $R^{15}$ and $R^{16}$ are either identical or different, and Z is a linking group that bonds the oxygen atoms through a carbon atom or a carbon chain.

Examples of the linear alkyl group having 1 to 20 carbon atoms that may be represented by $R^{15}$ and $R^{16}$ in the compound represented by the general formula (VII) include a methyl group, an ethyl group, a n-propyl group, a n-butyl group, a n-pentyl group, a n-hexyl group, a n-heptyl group, a n-octyl group, a n-nonyl group, a n-decyl group, and the like. Among these, linear alkyl groups having 1 to 12 carbon atoms are preferable.

Examples of the branched alkyl group having 3 to 20 carbon atoms that may be represented by $R^{15}$ and $R^{16}$ include alkyl groups that include a secondary carbon atom or a tertiary carbon atom (e.g., isopropyl group, isobutyl group, t-butyl group, isopentyl group, and neopentyl group). Among these, branched alkyl groups having 3 to 12 carbon atoms are preferable.

Examples of the linear alkenyl group having 3 to 20 carbon atoms that may be represented by $R^{15}$ and $R^{16}$ include an allyl group, a 3-butenyl group, a 4-hexenyl group, a 5-hexenyl group, a 7-octenyl group, a 10-dodecenyl group, and the like. Among these, linear alkenyl groups having 3 to 12 carbon atoms are preferable.

Examples of the branched alkenyl group having 3 to 20 carbon atoms that may be represented by $R^{15}$ and $R^{16}$ include an isopropenyl group, an isobutenyl group, an isopentenyl group, a 2-ethyl-3-hexenyl group, and the like. Among these, branched alkenyl groups having 3 to 12 carbon atoms are preferable.

Examples of the linear halogen-substituted alkyl group having 1 to 20 carbon atoms that may be represented by $R^{15}$ and $R^{16}$ include a methyl halide group, an ethyl halide group, a n-propyl halide group, a n-butyl halide group, a n-pentyl halide group, a n-hexyl halide group, a n-pentyl halide group, a n-octyl halide group, a nonyl halide group, a decyl halide group, a halogen-substituted undecyl group, a halogen-substituted dodecyl group, and the like. Among these, linear halogen-substituted alkyl groups having 1 to 12 carbon atoms are preferable.

Examples of the branched halogen-substituted alkyl group having 3 to 20 carbon atoms that may be represented by $R^{15}$ and $R^{16}$ include an isopropyl halide group, an isobutyl halide group, a 2-ethylhexyl halide group, a neopentyl halide group, and the like. Among these, branched halogen-substituted alkyl groups having 3 to 12 carbon atoms are preferable.

Examples of the linear halogen-substituted alkenyl group having 2 to 20 carbon atoms that may be represented by $R^{15}$ and $R^{16}$ include a 2-halogenated vinyl group, a 3-halogenated allyl group, a 3-halogenated 2-butenyl group, a 4-halogenated 3-butenyl group, a perhalogenated 2-butenyl group, a 6-halogenated 4-hexenyl group, a 3-trihalogenated methyl-2-propenyl group, and the like. Among these, linear halogen-substituted alkenyl groups having 2 to 12 carbon atoms are preferable.

Examples of the branched halogen-substituted alkenyl group having 3 to 20 carbon atoms that may be represented by $R^{15}$ and $R^{16}$ include a 3-trihalogenated 2-butenyl group, a 2-pentahalogenated ethyl-3-hexenyl group, a 6-halogenated 3-ethyl-4-hexenyl group, a 3-halogenated isobutenyl group, and the like. Among these, branched halogen-substituted alkenyl groups having 3 to 12 carbon atoms are preferable.

Examples of the cycloalkyl group having 3 to 20 carbon atoms that may be represented by $R^{15}$ and $R^{16}$ include a cyclopropyl group, a cyclobutyl group, a cyclopentyl group, a tetramethylcyclopentyl group, a cyclohexyl group, a methylcyclohexyl group, a cycloheptyl group, a cyclooctyl group, a cyclononyl group, a cyclodecyl group, a butylcyclopentyl group, and the like. Among these, cycloalkyl groups having 3 to 12 carbon atoms are preferable.

Examples of the cycloalkenyl group having 3 to 20 carbon atoms that may be represented by $R^{15}$ and $R^{16}$ include a cyclopropenyl group, a cyclopentenyl group, a cyclohexenyl group, a cyclooctenyl group, a norbornene group, and the like. Among these, cycloalkenyl groups having 3 to 12 carbon atoms are preferable.

Examples of the halogen-substituted cycloalkyl group having 3 to 20 carbon atoms that may be represented by $R^{15}$ and $R^{16}$ include a halogen-substituted cyclopropyl group, a halogen-substituted cyclobutyl group, a halogen-substituted cyclopentyl group, a halogen-substituted trimethylcyclopentyl group, a halogen-substituted cyclohexyl group, a halogen-substituted methylcyclohexyl group, a halogen-substituted cycloheptyl group, a halogen-substituted cyclooctyl group, a halogen-substituted cyclononyl group, a halogen-substituted cyclodecyl group, a halogen-substituted butylcyclopentyl group, and the like. Among these, halogen-substituted cycloalkyl groups having 3 to 12 carbon atoms are preferable.

Examples of the halogen-substituted cycloalkenyl group having 3 to 20 carbon atoms that may be represented by $R^{15}$ and $R^{16}$ include a halogen-substituted cyclopropenyl group, a halogen-substituted cyclobutenyl group, a halogen-substituted cyclopentenyl group, a halogen-substituted trimethylcyclopentenyl group, a halogen-substituted cyclohexenyl group, a halogen-substituted methylcyclohexenyl group, a halogen-substituted cycloheptenyl group, a halogen-substituted cyclooctenyl group, a halogen-substituted cyclononenyl group, a halogen-substituted cyclodecenyl group, a halogen-substituted butylcyclopentenyl group, and the like. Among these, halogen-substituted cycloalkenyl groups having 3 to 12 carbon atoms are preferable.

Examples of the aromatic hydrocarbon group having 6 to 24 carbon atoms that may be represented by $R^{15}$ and $R^{16}$ include a phenyl group, a methylphenyl group, a dimethylphenyl group, an ethylphenyl group, a benzyl group, a 1-phenylethyl group, a 2-phenylethyl group, a 2-phenylpropyl group, a 1-phenylbutyl group, a 4-phenylbutyl group, a 2-phenylheptyl group, a tolyl group, a xylyl group, a naphthyl group, a 1,8-dimethylnaphthyl group, and the like. Among these, aromatic hydrocarbon groups having 6 to 12 carbon atoms are preferable.

Examples of the halogen-substituted aromatic hydrocarbon group having 6 to 24 carbon atoms that may be represented by $R^{15}$ and $R^{16}$ include a phenyl halide group, a methylphenyl halide group, a methylphenyl trihalide group, a benzyl perhalide group, a phenyl perhalide group, a 2-phenyl-2-halogenated ethyl group, a naphthyl perhalide group, a 4-phenyl-2,3-dihalogenated butyl group, and the like. Among these, halogen-substituted aromatic hydrocarbon groups having 6 to 12 carbon atoms are preferable.

When $R^{15}$ or $R^{16}$ in the compound represented by the general formula (VII) is a group that includes a halogen atom, the halogen atom may be a fluorine atom, a chlorine atom, a bromine atom, or an iodine atom. The halogen atom is preferably a fluorine atom, a chlorine atom, or a bromine atom.

Examples of the phosphorus-containing hydrocarbon group having 2 to 24 carbon atoms terminated by a carbon atom (provided that a group that is terminated by a C=P group is excluded) that may be represented by $R^{15}$ and $R^{16}$ include dialkylphosphinoalkyl groups such as a dimethylphosphinomethyl group, a dibutylphosphinomethyl group, a dicyclohexylphosphinomethyl group, a dimethylphosphinoethyl group, a dibutylphosphinoethyl group, and a dicyclohexylphosphinoethyl group, diarylphosphinoalkyl groups such as a diphenylphosphinomethyl group and a ditolylphosphinomethyl group, phosphino group-substituted aryl groups such as a dimethylphosphinophenyl group and a diethylphosphinophenyl group, and the like. Among these, phosphorus-containing hydrocarbon groups having 2 to 12 carbon atoms are preferable.

Note that the expression "terminated by" used herein in connection with $R^{15}$ and $R^{16}$ means that $R^{15}$ or $R^{16}$ is bonded to the adjacent oxygen atom included in the compound represented by the general formula (VII) through an atom or a group by which $R^{15}$ or $R^{16}$ is terminated.

$R^{15}$ is preferably a linear alkyl group having 1 to 12 carbon atoms, a branched alkyl group having 3 to 12 carbon atoms, a vinyl group, a linear or branched alkenyl group having 3 to 12 carbon atoms, a linear halogen-substituted alkyl group having 1 to 12 carbon atoms, a branched halogen-substituted alkyl group having 3 to 12 carbon atoms, a linear or branched halogen-substituted alkenyl group having 3 to 12 carbon atoms, a cycloalkyl group having 3 to 12 carbon atoms, a cycloalkenyl group having 3 to 12 carbon atoms, a halogen-substituted cycloalkyl group having 3 to 12 carbon atoms, a halogen-substituted cycloalkenyl group having 3 to 12 carbon atoms, or an aromatic hydrocarbon group having 6 to 12 carbon atoms, more preferably a linear alkyl group having 1 to 12 carbon atoms, a branched alkyl group having 3 to 12 carbon atoms, a vinyl group, a linear or branched alkenyl group having 3 to 12 carbon atoms, a linear halogen-substituted alkyl group having 1 to 12 carbon atoms, a branched halogen-substituted alkyl group having 3 to 12 carbon atoms, a cycloalkyl group having 3 to 12 carbon atoms, a cycloalkenyl group having 3 to 12 carbon atoms, or an aromatic hydrocarbon group having 6 to 12 carbon atoms, and still more preferably a linear alkyl group having 1 to 12 carbon atoms, a branched alkyl group having 3 to 12 carbon atoms, or an aromatic hydrocarbon group having 6 to 12 carbon atoms.

$R^{16}$ is preferably a linear alkyl group having 1 to 12 carbon atoms, a branched alkyl group having 3 to 12 carbon atoms that is terminated by —$CH_2$—, a vinyl group, a linear alkenyl group having 3 to 12 carbon atoms, a branched alkenyl group having 3 to 12 carbon atoms that is terminated by —$CH_2$—, a linear halogen-substituted alkyl group having 1 to 12 carbon atoms, a branched halogen-substituted alkyl group having 3 to 12 carbon atoms that is terminated by —$CH_2$—, a linear halogen-substituted alkenyl group having 3 to 12 carbon atoms, a branched halogen-substituted alkenyl group having 3 to 12 carbon atoms that is terminated by —$CH_2$—, a cycloalkyl group having 4 to 12 carbon atoms that is terminated by —$CH_2$—, a cycloalkenyl group having 4 to 12 carbon atoms that is terminated by —$CH_2$—, a halogen-substituted cycloalkyl group having 4 to 12 carbon atoms that is terminated by —$CH_2$—, a halogen-substituted cycloalkenyl group having 4 to 12 carbon atoms that is terminated by —$CH_2$—, or an aromatic hydrocarbon group having 7 to 12 carbon atoms that is terminated by —$CH_2$—, more preferably a linear alkyl group having 1 to 12 carbon atoms, a branched alkyl group having 3 to 12 carbon atoms that is terminated by —$CH_2$—, a branched alkenyl group having 3 to 12 carbon atoms that is terminated by —$CH_2$—, a linear halogen-substituted alkyl group having 1 to 12 carbon atoms that is terminated by —$CH_2$—, a branched halogen-substituted alkyl group having 3 to 12 carbon atoms that is terminated by —$CH_2$—, a branched halogen-substituted alkenyl group having 3 to 12 carbon atoms that is terminated by —$CH_2$—, a cycloalkyl group having 4 to 12 carbon atoms that is terminated by —$CH_2$—, a cycloalkenyl group having 4 to 12 carbon atoms that is terminated by —$CH_2$—, a halogen-substituted cycloalkyl group having 4 to 12 carbon atoms that is terminated by —$CH_2$—, a halogen-substituted cycloalkenyl group having 4 to 12 carbon atoms that is terminated by —$CH_2$—, or an aromatic hydrocarbon group having 7 to 12 carbon atoms that is terminated by —$CH_2$—, and still more preferably a linear hydrocarbon group having 1 to 12 carbon atoms, a branched alkyl group having 3 to 12 carbon atoms that is terminated by —$CH_2$—, or an aromatic hydrocarbon group having 7 to 12 carbon atoms that is terminated by —$CH_2$—.

Note that the expression "terminated by" used herein in connection with $R^{16}$ means that $R^{16}$ is bonded to the adjacent oxygen atom included in the compound represented by the general formula (VII) through an atom or a group by which $R^{16}$ is terminated.

Examples of a combination of $R^{15}$ and $R^{16}$ include combinations of groups mentioned above as preferable groups. It is preferable that $R^{15}$ and $R^{16}$ be a combination of groups mentioned above as more preferable groups.

Z in the compound represented by the general formula (VII) is a divalent linking group that bonds the carbonate group and the ether group ($OR^{16}$) through a carbon atom or a carbon chain. Z may be a linking group that bonds the two oxygen atoms bonded to Z (i.e., bonded through Z) through a carbon chain, for example. It is preferable that Z be a linking group in which the carbon chain includes two carbon atoms.

Z is preferably a linear alkylene group having 1 to 20 carbon atoms, a branched alkylene group having 3 to 20 carbon atoms, a vinylene group, a linear or branched alkenylene group having 3 to 20 carbon atoms, a linear halogen-substituted alkylene group having 1 to 20 carbon atoms, a branched halogen-substituted alkylene group having 3 to 20 carbon atoms, a linear or branched halogen-substituted alkenylene group having 3 to 20 carbon atoms, a cycloalkylene group having 3 to 20 carbon atoms, a cycloalkenylene group having 3 to 20 carbon atoms, a halogen-substituted cycloalkylene group having 3 to 20 carbon atoms, a halogen-substituted cycloalkenylene group having 3 to 20 carbon atoms, an aromatic hydrocarbon group having 6 to 24 carbon atoms, a halogen-substituted aromatic hydrocarbon group having 6 to 24 carbon atoms, a nitrogen atom-containing hydrocarbon group having 1 to 24 carbon atoms, an oxygen atom-containing hydrocarbon group having 1 to 24 carbon atoms, or a phosphorus-containing hydrocarbon group having 1 to 24 carbon atoms.

Z is more preferably an ethylene group having 2 carbon atoms, a branched alkylene group having 3 to 12 carbon atoms, a vinylene group, a linear or branched alkenylene group having 3 to 12 carbon atoms, a linear halogen-substituted alkylene group having 2 to 12 carbon atoms, a branched halogen-substituted alkylene group having 3 to 12 carbon atoms, a linear or branched halogen-substituted alkenylene group having 3 to 12 carbon atoms, a cycloalkylene group having 3 to 12 carbon atoms, a cycloalkenylene group having 3 to 12 carbon atoms, a halogen-substituted cycloalkylene group having 3 to 12 carbon atoms, a halogen-substituted cycloalkenylene group having 3 to 12 carbon atoms, an aromatic hydrocarbon group having 6 to 12 carbon atoms, a halogen-substituted aromatic hydrocarbon group having 6 to 12 carbon atoms, a nitrogen atom-containing hydrocarbon group having 2 to 12 carbon atoms, an oxygen atom-containing hydrocarbon group having 2 to 12 carbon atoms, or a phosphorus-containing hydrocarbon group having 2 to 12 carbon atoms, and still more preferably a bidentate linking group selected from an ethylene group having 2 carbon atoms and a branched alkylene group having 3 to 12 carbon atoms. Note that the term "bidentate linking group" used herein refers to a group in which two oxygen atoms bonded to Z are bonded through a carbon chain, and the carbon chain includes two carbon atoms.

Examples of the linear alkylene group having 1 to 20 carbon atoms that may be represented by Z include an ethylene group, a trimethylene group, a tetramethylene group, a pentamethylene group, a hexamethylene group, a heptamethylene group, an octamethylene group, a nonamethylene group, a decamethylene group, an undecamethylene group, a dodecamethylene group, a tridecamethylene group, a tetradecamethylene group, and the like. Among these, linear alkylene groups having 2 to 12 carbon atoms are preferable, and an ethylene group is more preferable.

Examples of the branched alkylene group having 3 to 20 carbon atoms that may be represented by Z include a 1-methylethylene group, a 2-methyltrimethylene group, a 2-methyltetramethylene group, a 2-methylpentamethylene group, a 3-methylhexamethylene group, a 4-methylheptamethylene group, a 4-methyloctamethylene group, a 5-methylnonamethylene group, a 5-methyldecamethylene group, a 6-methylundecamethylene group, a 7-methyldodecamethylene group, a 7-methyltridecamethylene group, and the like. Among these, branched alkylene groups having 3 to 12 carbon atoms are preferable, and a 1-methylethylene group, a 2-methylethylene group, and a 1-ethylethylene group are more preferable.

Examples of the linear alkenylene group having 3 to 20 carbon atoms that may be represented by Z include a propenylene group, a butenylene group, a hexenylene group, an octenylene group, an octadecenylene group, and the like. Among these, linear alkenylene groups having 3 to 12 carbon atoms are preferable.

Examples of the branched alkenylene group having 3 to 20 carbon atoms that may be represented by Z include an isopropenylene group, a 1-ethylethenylene group, a 2-methylpropenylene group, a 2,2-dimethylbutenylene group, a 3-methyl-2-butenylene group, a 3-ethyl-2-butenylene group, a 2-methyloctenylene group, a 2,4-dimethyl-2-butenylene group, and the like. Among these, branched alkenylene groups having 3 to 12 carbon atoms that include an ethenylene linking group are preferable, and an isopropenylene group and a 1-ethylethenylene group are more preferable.

Examples of the linear halogen-substituted alkylene group having 1 to 20 carbon atoms that may be represented by Z include a dichloromethylene group, a chloromethylene group, a dichloroethylene group, a tetrachloroethylene group, and the like. Among these, linear halogen-substituted alkylene groups having 3 to 12 carbon atoms are preferable, and a chloroethylene group, a fluoroethylene group, a dichloroethylene group, a difluoroethylene group, and a tetrafluoroethylene group are more preferable.

Examples of the branched halogen-substituted alkylene group having 1 to 20 carbon atoms that may be represented by Z include a 1,2-bischloromethylethylene group, a 2,2-bis(chloromethyl)propylene group, a 1,2-bisdichloromethylethylene group, a 1,2-bis(trichloromethyl)ethylene group, a 2,2-dichloropropylene group, a 1,1,2,2-tetrachloroethylene group, a 1-trifluoromethylethylene group, a 1-pentafluorophenylethylene group, and the like. Among these, branched halogen-substituted alkylene groups having 3 to 12 carbon atoms are preferable, and a 1-chloroethylethylene group, a 1-trifluoromethylethylene group, and a 1,2-bis(chloromethyl)ethylene group are more preferable.

Examples of the linear halogen-substituted alkenylene group having 1 to 20 carbon atoms that may be represented by Z include a dichloroethenylene group, a difluoroethenylene group, a 3,3-dichloropropenylene group, a 1,2-difluoropropenylene group, and the like. Among these, linear halogen-substituted alkenylene groups having 3 to 12 carbon atoms are preferable, and a dichloroethenylene group and a difluoroethenylene group are more preferable.

Examples of the branched halogen-substituted alkylene group having 1 to 20 carbon atoms that may be represented by Z include a 3,4-dichloro-1,2-butylene group, a 2,2-dichloro-1,3-butylene group, a 1,2-difluoro-1,2-propylene group, and the like. Among these, branched halogen-substituted alkylene groups having 3 to 12 carbon atoms are preferable, and a chloromethylethenylene group, a trifluoromethylethenylene group, a 3,4-dichloro-1,2-butenylene group are more preferable.

Examples of the cycloalkylene group having 3 to 20 carbon atoms that may be represented by Z include a cyclopentylene group, a cyclohexylene group, a cyclopropylene group, a 2-methylcyclopropylene group, a cyclobutylene group, a 2,2-dimethylcyclobutylene group, a 2,3-dimethylcyclopentylene group, a 1,3,3-trimethylcyclohexylene group, a cyclooctylene group, and the like. Among these, cycloalkylene groups having 3 to 12 carbon atoms are preferable, and a 1,2-cycloalkylene group and a hydrocarbon group-substituted 1,2-cycloalkylene group are more preferable.

Examples of the cycloalkenylene group having 3 to 20 carbon atoms that may be represented by Z include a cyclopentenylene group, a 2,4-cyclopentadienylene group, a cyclohexenylene group, a 1,4-cyclohexadienyl group, a cycloheptenylene group, a methylcyclopentenylene group, a methylcyclohexenylene group, a methylcycloheptenylene group, a dicyclodecylene group, a tricyclodecylene group, and the like. Among these, cycloalkenylene groups having 3 to 12 carbon atoms are preferable, and a 1,2-cycloalkenylene group and a hydrocarbon group-substituted 1,2-cycloalkenylene group are more preferable.

Examples of the halogen-substituted cycloalkylene group having 3 to 20 carbon atoms that may be represented by Z include a 3-chloro-1,2-cyclopentylene group, a 3,4,5,6-tetrachloro-1,2-cyclohexylene group, a 3,3-dichloro-1,2-cyclopropylene group, a 2-chloromethylcyclopropylene group, a 3,4-dichloro-1,2-cyclobutylene group, a 3,3-bis(dichloromethyl)-1,2-cyclobutylene group, a 2,3-bis(dichloromethyl)cyclopentylene group, a 1,3,3-tris(fluoromethyl)-1,2-cyclohexylene group, a 3-trichloromethyl-1,2-cyclooctylene group, and the like. Among these, halogen-substituted cycloalkylene groups having 3 to 12 carbon atoms are preferable.

Examples of the halogen-substituted cycloalkenylene group having 3 to 20 carbon atoms that may be represented by Z include a 5-chloro-1,2-cyclo-4-hexenylene group, a 3,3,4,4-tetrafluoro-1,2-cyclo-6-octenylene group, and the like. Among these, halogen-substituted cycloalkenylene groups having 3 to 12 carbon atoms are preferable.

Examples of the aromatic hydrocarbon group having 6 to 24 carbon atoms that may be represented by Z include a 1,2-phenylene group, a 3-methyl-1,2-phenylene group, a 3,6-dimethyl-1,2-phenylene group, a 1,2-naphthylene group, a 2,3-naphthylene group, a 5-methyl-1,2-naphthylene group, a 9,10-phenanthrylene group, a 1,2-anthracenylene group, and the like. Among these, aromatic hydrocarbon groups having 6 to 12 carbon atoms are preferable.

Examples of the halogen-substituted aromatic hydrocarbon group having 6 to 24 carbon atoms that may be represented by Z include a 3-chloro-1,2-phenylene group, a 3-chloromethyl-1,2-phenylene group, a 3,6-dichloro-1,2-phenylene group, a 3,6-dichloro-4,5-dimethyl-1,2-phenylene group, a 3-chloro-1,2-naphthylene group, a 3-fluoro-1,2-naphthylene group, a 3,6-dichloro-1,2-phenylene group, a 3,6-difluoro-1,2-phenylene group, a 3,6-dibromo-1,2-phenylene group, a 1-chloro-2,3-naphthylene group, a 5-chloro-1,2-naphthylene group, a 2,6-dichloro-9,10-phenanthrylene group, a 5,6-dichloro-1,2-anthracenylene group, a 5,6-difluoro-1,2-anthracenylene, and the like. Among these, halogen-substituted aromatic hydrocarbon groups having 6 to 12 carbon atoms are preferable.

Examples of the nitrogen atom-containing hydrocarbon group having 1 to 24 carbon atoms that may be represented by Z include a 1-dimethylaminoethylene group, a 1,2-bisdimethylaminoethylene group, a 1-diethylaminoethylene group, a 2-diethylamino-1,3-propylene group, a 2-ethylamino-1,3-propylene group, a 4-dimethylamino-1,2-phenylene group, a 4,5-bis(dimethylamino)phenylene group, and the like. Among these, nitrogen atom-containing hydrocarbon groups having 2 to 12 carbon atoms are preferable.

Examples of the oxygen atom-containing hydrocarbon group having 1 to 24 carbon atoms that may be represented by Z include a 1-methoxyethylene group, a 2,2-dimethoxy-1,3-propanylene group, a 2-ethoxy-1,3-propanylene group, a 2-t-butoxy-1,3-propanylene group, a 2,3-dimethoxy-2,3-butylene group, a 4-methoxy-1,2-phenylene group, and the like. Among these, oxygen atom-containing hydrocarbon groups having 2 to 12 carbon atoms are preferable.

Examples of the phosphorus-containing hydrocarbon group having 1 to 24 carbon atoms that may be represented by Z include a 1-dimethylphosphinoethylene group, a 2,2-bis(dimethylphosphino)-1,3-propanylene group, a 2-diethylphosphino-1,3-propanylene group, a 2-t-butoxymethylphosphino-1,3-propanylene group, a 2,3-bis(diphenylphospino)-2,3-butylene group, a 4-methylphosphate-1,2-phenylene group, and the like. Among these, phosphorus-containing hydrocarbon groups having 1 to 12 carbon atoms are preferable.

When Z is a cyclic group (e.g., cycloalkylene group, cycloalkenylene group, halogen-substituted cycloalkylene group, halogen-substituted cycloalkenylene group, aromatic hydrocarbon group, or halogen-substituted aromatic hydrocarbon group), the two oxygen atoms bonded to Z may be bonded through two adjacent carbon atoms that form the cyclic group.

Specific examples of the compound represented by the general formula (VII) include 2-methoxyethyl methyl carbonate, 2-ethoxyethyl methyl carbonate, 2-propoxyethyl methyl carbonate, 2-(2-ethoxyethyloxy)ethyl methyl carbonate, 2-benzyloxyethyl methyl carbonate, (2-methoxypropyl)methyl carbonate, 2-ethoxypropyl methyl carbonate, 2-methyl(2-methoxy)butyl methyl carbonate, 2-methyl(2-ethoxy)butyl methyl carbonate, 2-methyl(2-methoxy)pentyl methyl carbonate, 2-methyl(2-ethoxy)pentyl methyl carbonate, 1-phenyl(2-methoxy)propyl carbonate, 1-phenyl(2-ethoxy)propyl methyl carbonate, 1-phenyl(2-benzyloxy)propyl methyl carbonate, 1-phenyl(2-methoxy)ethyl methyl carbonate, 1-phenyl(2-ethoxy)ethyl methyl carbonate, 1-methyl-1-phenyl(2-methoxy)ethyl methyl carbonate, 1-methyl-1-phenyl(2-ethoxy)ethyl methyl carbonate, 1-methyl-1-phenyl(2-benzyloxy)ethyl methyl carbonate, 1-methyl-1-phenyl(2-(2-ethoxyethyloxy))ethyl methyl carbonate, 2-methoxyethyl ethyl carbonate, 2-ethoxyethyl ethyl carbonate, 1-phenyl(2-methoxy)ethyl ethyl carbonate, 1-phenyl(2-ethoxy)ethyl ethyl carbonate, 1-phenyl(2-propoxy)ethyl ethyl carbonate, 1-phenyl(2-butoxy)ethyl ethyl carbonate, 1-phenyl(2-isobutyloxy)ethyl ethyl carbonate, 1-phenyl(2-(2-ethoxyethyloxy))ethyl ethyl carbonate, 1-methyl-1-phenyl(2-methoxy)ethyl ethyl carbonate, 1-methyl-1-phenyl(2-ethoxy)ethyl ethyl carbonate, 1-methyl-1-phenyl(2-propoxy)ethyl ethyl carbonate, 1-methyl-1-phenyl(2-butoxy)ethyl ethyl carbonate, 1-methyl-1-phenyl(2-isobutyloxy)ethyl ethyl carbonate, 1-methyl-1-phenyl(2-benzyloxy)ethyl ethyl carbonate, 1-methyl-1-phenyl(2-(2-ethoxyethyloxy))ethyl ethyl carbonate, 2-methoxyethyl phenyl carbonate, 2-ethoxyethyl phenyl carbonate, 2-propoxyethyl phenyl carbonate, 2-butoxyethyl phenyl carbonate, 2-isobutyloxyethyl phenyl carbonate, 2-benzyloxyethyl phenyl carbonate, 2-(2-ethoxyethyloxy)ethyl phenyl carbonate, 2-methoxyethyl p-methylphenyl carbonate, 2-ethoxyethyl p-methylphenyl carbonate, 2-propoxyethyl p-methylphenyl carbonate, 2-butoxyethyl p-methylphenyl carbonate, 2-isobutyloxyethyl p-methylphenyl carbonate, 2-benzyloxyethyl p-methylphenyl carbonate, 2-(2-ethoxyethyloxy)ethyl p-methylphenyl carbonate, 2-methoxyethyl o-methylphenyl carbonate, 2-ethoxyethyl o-methylphenyl carbonate, 2-propoxyethyl o-methylphenyl carbonate, 2-butoxyethyl o-methylphenyl carbonate, 2-isobutyloxyethyl o-methylphenyl carbonate, 2-benzyloxyethyl o-methylphenyl carbonate, 2-(2-ethoxyethyloxy)ethyl o-methylphenyl carbonate, 2-methoxyethyl o,p-dimethylphenyl carbonate, 2-ethoxyethyl o,p-dimethylphenyl carbonate, 2-propoxyethyl o,p-dimethylphenyl carbonate, 2-butoxyethyl o,p-dimethylphenyl carbonate, 2-isobutyloxyethyl o,p-dimethylphenyl carbonate, 2-benzyloxyethyl o,p-dimethylphenyl carbonate, 2-(2-ethoxyethyloxy)ethyl o,p-dimethylphenyl carbonate, 2-methoxypropyl phenyl carbonate, 2-ethoxypropyl phenyl carbonate, 2-propoxypropyl phenyl carbonate, 2-butoxypropyl phenyl carbonate, 2-isobutyloxypropyl phenyl carbonate, 2-(2-ethoxyethyloxy)propyl phenyl carbonate, 2-phenyl(2-methoxy)ethyl phenyl carbonate, 2-phenyl(2-ethoxy)ethyl phenyl carbonate, 2-phenyl(2-propoxy)ethyl phenyl carbonate, 2-phenyl(2-butoxy)ethyl phenyl carbonate, 2-phenyl(2-isobutyloxy)ethyl phenyl carbonate, 2-phenyl(2-(2-ethoxyethyloxy))ethyl phenyl carbonate, 1-phenyl(2-methoxy)propyl phenyl carbonate, 1-phenyl(2-ethoxy)propyl phenyl carbonate, 1-phenyl(2-propoxy)propyl phenyl carbonate, 1-phenyl(2-isobutyloxy)propyl phenyl carbonate, 1-phenyl(2-methoxy)ethyl phenyl carbonate, 1-phenyl(2-ethoxy)ethyl phenyl carbonate, 1-phenyl(2-propoxy)ethyl phenyl carbonate, 1-phenyl(2-butoxy)ethyl phenyl carbonate, 1-phenyl(2-isobutyloxy)ethyl phenyl carbonate, 1-phenyl(2-(2-ethoxyethyloxy))ethyl phenyl carbonate, 1-methyl-1-phenyl(2-methoxy)ethylphenyl carbonate, 1-methyl-1-phenyl(2-ethoxy)ethyl phenyl carbonate, 1-methyl-1-phenyl(2-propoxy)ethyl phenyl carbonate, 1-methyl-1-phenyl(2-butoxy)ethyl phenyl carbonate, 1-methyl-1-phenyl(2-isobutyloxy)ethyl phenyl carbonate, 1-methyl-1-phenyl(2-benzyloxy)ethyl phenyl carbonate, and 1-methyl-1-phenyl(2-(2-ethoxyethyloxy))ethyl phenyl carbonate. Among these, one or more compounds selected from (2-ethoxyethyl) methyl carbonate, 2-ethoxyethyl ethyl carbonate, (2-propoxyethyl) propyl carbonate, (2-butoxyethyl) butyl carbonate, (2-butoxyethyl) ethyl carbonate, (2-ethoxyethyl) propyl carbonate, (2-ethoxyethyl) phenyl carbonate, and (2-ethoxyethyl) p-methylphenyl carbonate are preferable.

Among these, (2-ethoxyethyl) methyl carbonate, 2-ethoxyethyl ethyl carbonate, and (2-ethoxyethyl) phenyl carbonate are particularly preferable.

The first internal electron donor compound is particularly preferably one or more compounds selected from dimethyl diisobutylmalonate, diethyl diisobutylmalonate, dimethyl benzylidenemalonate, and diethyl benzylidenemalonate.

In the first step included in the method for producing a solid catalyst component for olefin polymerization according to one embodiment of the invention, the magnesium compound, the tetravalent titanium halide compound, and one or more first internal electron donor compounds excluding the aromatic dicarboxylic acid diester are brought into contact with each other to effect a reaction, followed by washing.

In the first step, it is preferable to bring the magnesium compound, the tetravalent titanium halide compound, and the first internal electron donor compound into contact with each other to effect a reaction in the presence of an inert organic solvent.

It is preferable to use a compound that is liquid at room temperature (20° C.) and has a boiling point of 50 to 150° C. as the inert organic solvent. It is more preferable to use an aromatic hydrocarbon compound or a saturated hydrocarbon compound that is liquid at room temperature and has a boiling point of 50 to 150° C. as the inert organic solvent.

The inert organic solvent may be one or more compounds selected from linear aliphatic hydrocarbon compounds such as hexane, heptane, and decane, branched aliphatic hydrocarbon compounds such as methylheptane, alicyclic hydrocarbon compounds such as cyclohexane, methylcyclohexane, and ethylcyclohexane, aromatic hydrocarbon compounds such as toluene, xylene, and ethylbenzene, and the like.

Among these, aromatic hydrocarbon compounds that are liquid at room temperature and have a boiling point of 50 to 150° C. are preferable since the activity of the resulting solid catalyst component and the stereoregularity of the resulting polymer can be improved.

In the first step included in the method for producing a solid catalyst component for olefin polymerization according to one embodiment of the invention, the magnesium compound, the tetravalent titanium halide compound, and the first internal electron donor compound may be brought into contact with each other by appropriately mixing the magnesium compound, the tetravalent titanium halide compound, and the first internal electron donor compound in the presence of the inert organic solvent.

In the first step, the magnesium compound, the tetravalent titanium halide compound, and the first internal electron donor compound are brought into contact with each other to effect a reaction.

The reaction temperature is preferably 0 to 130° C., more preferably 30 to 130° C., still more preferably 40 to 120° C., and yet more preferably 80 to 120° C. The reaction time is preferably 1 minute or more, more preferably 10 minutes or more, still more preferably 30 minutes to 6 hours, still more preferably 30 minutes to 5 hours, and yet more preferably 1 to 4 hours.

In the first step, the components may be subjected to a low-temperature aging treatment before effecting the reaction.

The low-temperature aging treatment brings the components into contact with each other (preliminary reaction) at a temperature lower than the reaction temperature. The low-temperature aging temperature is preferably −20 to 70° C., more preferably −10 to 60° C., and still more preferably −10 to 30° C. The low-temperature aging time is preferably 1 minute to 6 hours, more preferably 5 minutes to 4 hours, and still more preferably 30 minutes to 3 hours.

When performing the first step that brings the magnesium compound, the tetravalent titanium halide compound, and the first internal electron donor compound into contact with each other to effect a reaction, the tetravalent titanium halide compound is preferably used in an amount of 0.5 to 100 mol, more preferably 1 to 50 mol, and still more preferably 1 to 10 mol, based on 1 mol of the magnesium compound.

When performing the first step that brings the magnesium compound, the tetravalent titanium halide compound, and the first internal electron donor compound into contact with each other to effect a reaction, the first internal electron donor compound is preferably used in an amount of 0.01 to 10 mol, more preferably 0.01 to 1 mol, and still more preferably 0.02 to 0.6 mol, based on 1 mol of the magnesium compound.

When using the inert organic solvent in the first step, the inert organic solvent is preferably used in an amount of 0.001 to 500 mol, more preferably 0.5 to 100 mol, and still more preferably 1.0 to 20 mol, based on 1 mol of the magnesium compound.

In the first step, it is preferable to bring the components into contact with each other with stirring in a vessel equipped with a stirrer that contains an inert gas atmosphere from which water and the like have been removed.

After completion of the reaction, it is preferable to wash the reaction product after allowing the reaction mixture to stand, appropriately removing the supernatant liquid to achieve a wet state (slurry state), and optionally drying the reaction mixture by hot-air drying or the like.

After completion of the reaction, the reaction product is washed after allowing the reaction mixture to stand, and appropriately removing the supernatant liquid.

The reaction product is normally washed using a washing agent.

Examples of the washing agent include those mentioned above in connection with the inert organic solvent that is appropriately used in the first step. The washing agent is preferably one or more compounds selected from linear aliphatic hydrocarbon compounds that are liquid at room temperature and have a boiling point of 50 to 150° C., such as hexane, heptane, and decane, alicyclic hydrocarbon compounds that are liquid at room temperature and have a boiling point of 50 to 150° C., such as methylcyclohexane and ethylcyclohexane, aromatic hydrocarbon compounds that are liquid at room temperature and have a boiling point of 50 to 150° C., such as toluene, xylene, ethylbenzene, and o-dichlorobenzene, and the like.

It is possible to easily remove (dissolve) by-products and impurities from the reaction product by utilizing the washing agent.

In the first step included in the method for producing a solid catalyst component for olefin polymerization according to one embodiment of the invention, the reaction product is preferably washed at 0 to 120° C., more preferably 0 to 110° C., more preferably 30 to 110° C., still more preferably 50 to 110° C., and yet more preferably 50 to 100° C.

When implementing the method for producing a solid catalyst component for olefin polymerization according to one embodiment of the invention, it is preferable to wash the reaction product by adding the desired amount of washing agent to the reaction product, stirring the mixture, and removing the liquid phase using a filtration method or a decantation method.

When washing the reaction product a plurality of times (two or more times) (as described later), the subsequent reaction (i.e., the reaction effected in the subsequent step) may be effected without removing the washing agent that was added last to the reaction product.

It is preferable to use the washing agent in the first step in an amount of 1 to 500 mL, more preferably 3 to 200 mL, and still more preferably 5 to 100 mL, per gram of the reaction product.

The reaction product may be washed a plurality of times. The reaction product is preferably washed 1 to 20 times, more preferably 2 to 15 times, and still more preferably 2 to 10 times.

When washing the reaction product a plurality of times, it is preferable to use the washing agent in an amount within the above range each time the reaction product is washed.

According to the method for producing a solid catalyst component for olefin polymerization according to one embodiment of the invention, it is possible to remove unreacted raw material components, reaction by-products (e.g., alkoxytitanium halide and titanium tetrachloride-carboxylic acid complex), and impurities that remain in the reaction product by washing the reaction product in the first step after bringing the components into contact with each other to effect a reaction.

In the first step included in the method for producing a solid catalyst component for olefin polymerization according to one embodiment of the invention, a post-treatment may be appropriately performed after washing the reaction product.

For example, a tetravalent titanium halide compound may be brought into contact with the reaction product obtained by the reaction, or the reaction product that has been washed, or the reaction product may be washed after bringing a tetravalent titanium halide compound into contact with the reaction product. The reaction product may be washed during the post-treatment in the same manner as described above.

When implementing the method for producing a solid catalyst component for olefin polymerization according to one embodiment of the invention, the reaction product subjected to the post-treatment in the first step may be subjected to the second step (described below). Note that it is preferable to subject the reaction product (that has been washed) directly to the second step without subjecting the reaction product to the post-treatment.

The product obtained by the first step is normally in the form of a suspension. The product in the form of a suspension may be allowed to stand, and the supernatant liquid may be removed to achieve a wet state (slurry state). The product may optionally be dried by hot-air drying or the like. The product in the form of a suspension may be subjected directly to the second step. When subjecting the product in the form of a suspension directly to the second step, the drying treatment can be omitted, and it is unnecessary to add an inert organic solvent in the second step.

Second Step

In the second step included in the method for producing a solid catalyst component for olefin polymerization according to one embodiment of the invention, the tetravalent titanium halide compound and one or more second internal electron donor compounds are brought into contact with the product obtained by the first step to effect a reaction, followed by washing.

Examples of the tetravalent titanium halide compound used in the second step included in the method for producing a solid catalyst component for olefin polymerization according to one embodiment of the invention include those mentioned above in connection with the tetravalent titanium halide compound used in the first step.

The second internal electron donor compound used in the second step included in the method for producing a solid catalyst component for olefin polymerization according to one embodiment of the invention is preferably one or more compounds selected from organic compounds that include two or more electron donor sites and do not include silicon. Examples of the electron donor site include a hydroxyl group (—OH), a carbonyl group (>C=O), an ether linkage (—OR), an amino group (—NH$_2$, —NHR, or —NHRR'), a cyano group (—CN), an isocyanate group (—N=C=O), and an amide linkage (—C(=O)NH— or —C(=O)NR—). A carbonyl group (>C=O) may be those included in an aldehyde group (—C(=O)H), a carboxyl group (—C(=O)OH), a keto group (—C(=O)R), a carbonate group (—O—C(=O)O—), an ester linkage (—C(=O)O—), a urethane linkage (—NH—C(=O)O—), and the like. Among these, esters such as a polycarboxylic acid ester, and ether compounds such as a diether and an ether carbonate are preferable. These internal electron donor compounds may be used either alone or in combination.

Examples of the polycarboxylic acid ester that may be used in the second step include carboxylic acid diesters, and substituted carboxylic acid diesters in which some of the hydrogen atoms bonded to the carbon atom that forms the molecular skeleton are substituted with a substituent.

Examples of the carboxylic acid diesters include aromatic dicarboxylic acid diesters such as a phthalic acid diester and an isophthalic acid diester, aliphatic dicarboxylic acid diesters such as a succinic acid diester, a maleic acid diester, a malonic acid diester, and a glutaric acid diester, alicyclic dicarboxylic acid diesters such as a cycloalkanedicarboxylic acid diester and a cycloalkenedicarboxylic acid diester, and the like.

Examples of the substituted carboxylic acid diesters include halogen-substituted carboxylic acid diesters in which a hydrogen atom is substituted with a halogen atom such as a fluorine atom, a chlorine atom, a bromine atom, or an iodine atom, alkyl-substituted carboxylic acid diesters in which a hydrogen atom is substituted with an alkyl group having 1 to 8 carbon atoms, alkyl halide-substituted carboxylic acid diesters in which a hydrogen atom is substituted with a halogen atom and an alkyl group having 1 to 8 carbon atoms, and the like.

Specific examples of the substituted carboxylic acid diesters include a substituted cycloalkanedicarboxylic acid diester in which some of the hydrogen atoms of the cycloalkyl group are substituted with an alkyl group or the like, a substituted malonic acid diester, an alkyl-substituted maleic acid diester, and the like.

Examples of the aromatic dicarboxylic acid diester that may be used as the second internal electron donor compound include those mentioned above in connection with the aromatic dicarboxylic acid diester represented by the general formula (I).

Specific examples of the succinic acid diester, the maleic acid diester, the alkyl-substituted maleic acid diester, the malonic acid diester, the substituted malonic acid diester, the alkylidenemalonic acid diester, the cycloalkanedicarboxylic acid diester, the substituted cycloalkanedicarboxylic acid diester (in which some of the hydrogen atoms of the cycloalkyl group are substituted with an alkyl group or the like), the diether, and the ether carbonate that may be used as the second internal electron donor compound include those mentioned above in connection with the first internal electron donor compound. Note that the diether that may be used as the second internal electron donor compound does not include a silicon atom.

The second internal electron donor compound is particularly preferably one or more compounds selected from diethyl phthalate, di-n-propyl phthalate, di-n-butyl phthalate, diisobutyl phthalate, dimethyl diisobutylmalonate, diethyl diisobutylmalonate, dimethyl benzylidenemalonate, and diethyl benzylidenemalonate.

In the second step included in the method for producing a solid catalyst component for olefin polymerization according to one embodiment of the invention, the tetravalent titanium halide compound and one or more second internal electron donor compounds are brought into contact with the reaction product obtained by the first step to effect a reaction.

In the second step, the tetravalent titanium halide compound and the second internal electron donor compound may preferably be brought into contact with the reaction product obtained by the first step by appropriately mixing the tetravalent titanium halide compound, the second internal electron donor compound, and the reaction product obtained by the first step in the presence of an inert organic solvent similar to those mentioned above in connection with the first step.

In the second step, the components may be brought into contact with the reaction product obtained by the first step to effect a reaction under arbitrary conditions. Contact-reaction conditions similar to those employed in the first step may be used.

When performing the second step that brings the tetravalent titanium halide compound and the second internal electron donor compound into contact with the reaction product obtained by the first step to effect a reaction, the tetravalent titanium halide compound is preferably used in an amount of 0.1 to 50 mol, more preferably 0.2 to 20 mol, and still more preferably 0.3 to 10 mol, based on 1 mol of the magnesium compound (that is added in the first step).

When performing the second step that brings the tetravalent titanium halide compound and the second internal electron donor compound into contact with the reaction product obtained by the first step to effect a reaction, the molar ratio (molar quantity of second internal electron donor compound/molar quantity of magnesium compound) of the second internal electron donor compound to the magnesium compound (that is added in the first step) is preferably 0.001 to 10, more preferably 0.002 to 1, and still more preferably 0.003 to 0.6.

When performing the second step that brings the tetravalent titanium halide compound and the second internal electron donor compound into contact with the reaction product obtained by the first step to effect a reaction, the molar ratio (molar quantity of second internal electron donor compound/molar quantity of first internal electron donor compound) of the second internal electron donor compound to the first internal electron donor compound (that is added in the first step) is preferably 0.01 to 0.9, more preferably 0.01 to 0.6, and still more preferably 0.02 to 0.4.

When the molar ratio (molar quantity of second internal electron donor compound/molar quantity of first internal electron donor compound) of the second internal electron donor compound to the first internal electron donor compound is within the above range, it is possible to easily suppress a situation in which a large amount of a complex compound of the second internal electron donor compound and the tetravalent titanium halide compound is formed, and easily improve polymerization activity and stereoregularity when polymerizing an olefin using the resulting solid catalyst component.

When using an inert organic solvent in the second step, the inert organic solvent is preferably used in an amount of 0.001 to 500 mol, more preferably 0.5 to 100 mol, and still more preferably 1.0 to 20 mol, based on 1 mol of the magnesium compound (that is added in the first step).

When implementing the method for producing a solid catalyst component for olefin polymerization according to one embodiment of the invention, it is preferable to add the necessary amount of the magnesium compound to the reaction system in the first step, and not add the magnesium compound to the reaction system in the second step, taking account of the reaction efficiency and the like.

In the second step, it is preferable to bring the components into contact with each other with stirring in a vessel equipped with a stirrer that contains an inert gas atmosphere from which water and the like have been removed.

After completion of the reaction, it is preferable to wash the reaction product after allowing the reaction mixture to stand, appropriately removing the supernatant liquid to achieve a wet state (slurry state), and optionally drying the reaction mixture by hot-air drying or the like.

In the second step, the reaction product is washed after completion of the reaction.

The reaction product is normally washed using a washing agent. Examples of the washing agent include those mentioned above in connection with the first step.

The washing temperature, the washing method, the amount of washing agent, the number of washing operations, and the like employed in the second step may be the same as those described above in connection with the first step.

According to the method for producing a solid catalyst component for olefin polymerization according to one embodiment of the invention, it is possible to remove unreacted raw material components, reaction by-products (e.g., alkoxytitanium halide and titanium tetrachloride-carboxylic acid complex), and impurities that remain in the reaction product by washing the reaction product in the second step after bringing the components into contact with each other to effect a reaction.

In the second step included in the method for producing a solid catalyst component for olefin polymerization according to one embodiment of the invention, a post-treatment may be appropriately performed after washing the reaction product.

For example, a tetravalent titanium halide compound may be brought into contact with the reaction product that has been washed, or the reaction product may be washed after bringing a tetravalent titanium halide compound into contact with the reaction product. The reaction product may be washed during the post-treatment in the same manner as described above.

When implementing the method for producing a solid catalyst component for olefin polymerization according to one embodiment of the invention, the reaction product subjected to the post-treatment in the second step may be subjected to the third step (described below). Note that it is preferable to subject the reaction product obtained by the reaction, or the reaction product that has been washed, directly to the third step without subjecting the reaction product to the post-treatment.

The product obtained by the second step is normally in the form of a suspension. The product in the form of a suspension may be appropriately allowed to stand, and the supernatant liquid may be removed to achieve a wet state (slurry state). The product may optionally be dried by hot-air drying or the like. The product in the form of a suspension may be subjected directly to the third step. When subjecting the product in the form of a suspension directly to the third step, the drying treatment can be omitted, and it is unnecessary to add an inert organic solvent in the third step.

Third Step

In the third step included in the method for producing a solid catalyst component for olefin polymerization according to one embodiment of the invention, one or more third internal electron donor compounds are brought into contact with the product obtained by the second step to effect a reaction.

Examples of the third internal electron donor compound used in connection with the method for producing a solid catalyst component for olefin polymerization according to one embodiment of the invention include the compounds mentioned above in connection with the second internal electron donor compound.

The third electron donor compound may be the same as or different from the first electron donor compound, and may be the same as or different from the second electron donor compound.

In the third step included in the method for producing a solid catalyst component for olefin polymerization according to one embodiment of the invention, the third internal electron donor compound is brought into contact with the reaction product obtained by the second step to effect a reaction.

In the third step, the third internal electron donor compound may preferably be brought into contact with the reaction product obtained by the second step by appropriately mixing the third internal electron donor compound and the reaction product obtained by the second step in the presence of an inert organic solvent similar to those mentioned above in connection with the first step.

In the third step, the third internal electron donor compound may be brought into contact with the reaction product obtained by the second step under arbitrary conditions. Contact-reaction conditions similar to those employed in the first step may be used.

When performing the third step that brings the third internal electron donor compound into contact with the reaction product obtained by the second step to effect a reaction, the molar ratio (molar quantity of third internal electron donor compound/molar quantity of magnesium compound) of the third internal electron donor compound to the magnesium compound (that is added in the first step) is preferably 0.001 to 10, more preferably 0.002 to 1, and still more preferably 0.003 to 0.6.

When performing the third step that brings the third internal electron donor compound into contact with the reaction product obtained by the second step to effect a reaction, the molar ratio (molar quantity of third internal electron donor compound/molar quantity of first internal electron donor compound) of the third internal electron donor compound to the first internal electron donor compound (that is added in the first step) is preferably 0.01 to 0.9, more preferably 0.01 to 0.6, and still more preferably 0.02 to 0.4.

When the molar ratio (molar quantity of third internal electron donor compound/molar quantity of first internal electron donor compound) of the third internal electron donor compound to the first internal electron donor compound is within the above range, it is possible to easily suppress a situation in which a large amount of a complex compound of the third internal electron donor compound and the tetravalent titanium halide compound is formed, and easily improve polymerization activity and stereoregularity when polymerizing an olefin using the resulting solid catalyst component.

It is preferable that the molar quantity of the third internal electron donor compound used in the third step be smaller than the molar quantity of the first internal electron donor compound used in the first step, and equal to or smaller than the molar quantity of the second internal electron donor compound used in the second step (i.e., molar quantity of first internal electron donor compound>molar quantity of second internal electron donor compound≥molar quantity of third internal electron donor compound).

It is preferable that the total molar quantity of the second internal electron donor compound used in the second step and the third internal electron donor compound used in the third step be smaller than the molar quantity of the first internal electron donor compound used in the first step (i.e., molar quantity of first internal electron donor compound> (molar quantity of second internal electron donor compound+molar quantity of third internal electron donor compound)).

The molar ratio (total molar quantity of the second internal electron donor compound used in the second step and the third internal electron donor compound used in the third step/molar quantity of the first internal electron donor compound used in the first step) of the total molar quantity of the second internal electron donor compound used in the second step and the third internal electron donor compound used in the third step to the molar quantity of the first internal electron donor compound used in the first step is preferably 0.02 to 0.95, more preferably 0.02 to 0.9, and still more preferably 0.02 to 0.8.

When the first internal electron donor compound used in the first step is an aliphatic polycarboxylic acid ester or an alicyclic polycarboxylic acid ester, the second internal electron donor compound used in the second step is a carboxylic acid diester, and the third internal electron donor compound used in the third step is a carboxylic acid diester, the total number of carbon atoms of the ester residue of the first internal electron donor compound, the total number of carbon atoms of the ester residue of the second internal electron donor compound, and the total number of carbon atoms of the ester residue of the third internal electron donor compound may be either identical or different.

An internal electron donor compound in which the number of carbon atoms of the ester residue is small normally exhibits high adhesion to a carrier, and allows particles of a solid catalyst component to easily aggregate. However, a decrease in polymerization activity tends to occur when using a solid catalyst component that supports only an internal electron donor compound in which the number of carbon atoms of the ester residue is small.

On the other hand, an internal electron donor compound in which the number of carbon atoms of the ester residue is large exhibits low adhesion to a carrier, but improves polymerization activity. Therefore, it is preferable to preferentially incorporate an internal electron donor compound in which the number of carbon atoms of the ester residue is large and which exhibits low adhesion to a carrier in the solid catalyst component, and then bring a small amount of an internal electron donor compound in which the number of carbon atoms of the ester residue is small and which exhibits high adhesion to a carrier into contact with the solid catalyst component (optionally by stepwise addition) to effect a reaction, since aggregation of the catalyst particles and a decrease in polymerization activity can be suppressed.

When using an inert organic solvent in the third step, the inert organic solvent is preferably used in an amount of 0.001 to 500 mol, more preferably 0.5 to 100 mol, and still more preferably 1.0 to 20 mol, based on 1 mol of the magnesium compound (that is added in the first step).

When using an inert organic solvent in the third step, it is possible to suppress interaction between the third internal electron donor compound and the tetravalent titanium halide compound, and suppress precipitation of a complex compound of the third internal electron donor compound and the tetravalent titanium halide compound in the solid catalyst component by reducing the amount of tetravalent titanium halide compound (unreacted tetravalent titanium halide compound) in the inert organic solvent. Therefore, it is preferable to control the concentration of a tetravalent titanium halide compound in the inert organic solvent to 0 to 5 mass %, more preferably 0 to 3 mass %, and still more preferably 0 to 1 mass %.

Specifically, when implementing the method for producing a solid catalyst component for olefin polymerization according to one embodiment of the invention, it is desirable to not add a tetravalent titanium halide compound to the reaction system in the third step.

When implementing the method for producing a solid catalyst component for olefin polymerization according to one embodiment of the invention, it is preferable to add the necessary amount of the magnesium compound to the reaction system in the first step, and not add the magnesium compound to the reaction system in the third step, taking account of the reaction efficiency and the like.

In the third step, it is preferable to bring the components into contact with each other with stirring in a vessel equipped with a stirrer that contains an inert gas atmosphere from which water and the like have been removed.

After completion of the reaction, it is preferable to wash the reaction product after allowing the reaction mixture to stand, appropriately removing the supernatant liquid to achieve a wet state (slurry state), and optionally drying the reaction mixture by hot-air drying or the like.

It is preferable to wash the reaction product in the third step after completion of the reaction.

The reaction product is normally washed using a washing agent. Examples of the washing agent include those mentioned above in connection with the first step.

The washing temperature, the washing method, the amount of washing agent, the number of washing operations, and the like employed in the third step may be the same as those described above in connection with the first step.

According to the method for producing a solid catalyst component for olefin polymerization according to one embodiment of the invention, it is possible to remove unreacted raw material components, reaction by-products (e.g., alkoxytitanium halide and titanium tetrachloride-carboxylic acid complex), and impurities that remain in the reaction product by washing the reaction product in the third step after bringing the components into contact with each other to effect a reaction.

After completion of the reaction, the suspension obtained by washing may be appropriately allowed to stand, the supernatant liquid may be removed to achieve a wet state (slurry state), and the reaction product may optionally be dried by hot-air drying or the like.

The product obtained after washing may be used directly as the solid catalyst component for olefin polymerization. Alternatively, the product may be brought into contact with a tetravalent titanium halide compound, washed (post-treatment), and used as the solid catalyst component for olefin polymerization. The product may be washed in the same manner as described above.

The resulting solid catalyst component for olefin polymerization may be formed in the shape of particles using a spray dry method that sprays and dries a solution or a suspension using a sprayer. A spherical solid catalyst component for olefin polymerization having a sharp particle size distribution can be easily obtained without using a spherical magnesium compound in the first step by forming the solid catalyst component in the shape of particles using the spray dry method.

It is preferable to add only small amounts of an aluminum compound and a silicon compound to the reaction system in the second step and the third step, or not add an aluminum compound and a silicon compound to the reaction system in the second step and the third step. It is particularly preferable to not add an organoaluminum compound such as an alkylaluminum and an organosilicon compound such as an alkoxysilane to the reaction system in the second step and the third step.

If the second step and the third step are performed in the presence of an organoaluminum compound (e.g., alkylaluminum compound or alkylaluminum halide), a reaction in which the internal electron donor compound supported on the product is removed easily occurs. If the second step and the third step are performed in the presence of a silicon compound (e.g., alkoxysilane), adsorption of the internal electron donor compound and adsorption of the silicon compound compete, and the desired effects may not be obtained.

The method for producing a solid catalyst component for olefin polymerization according to one embodiment of the invention may preferably be implemented as described below.

In the first step, a spherical magnesium compound is suspended in an inert organic solvent to prepare a suspension, and the tetravalent titanium halide compound is brought into contact with the suspension to effect a reaction.

The first internal electron donor compound is brought into contact with the suspension at −20 to 130° C. before or after bringing the tetravalent titanium halide compound into contact with the suspension, and the reaction product is washed with an inert organic solvent to obtain a solid reaction product (α). It is preferable to effect a low-temperature aging reaction before or after bringing the first internal electron donor compound into contact with the suspension.

In the second step, the tetravalent titanium halide compound and the second internal electron donor compound are brought into contact with the solid reaction product (α) obtained by the first step at 20 to 130° C. (preferably 30 to 120° C., and more preferably 80 to 110° C.) to effect a reaction, and the reaction product is washed with an inert organic solvent to obtain a solid reaction product (β). The above operation (i.e., contact with the tetravalent titanium halide compound and washing) may be repeated a plurality of times.

In the third step, the third internal electron donor compound is brought into contact with the solid reaction product (β) obtained by the second step at 20 to 130° C. (preferably 30 to 120° C., and more preferably 80 to 110° C.) in the presence of an inert organic solvent to effect a reaction to obtain the target solid catalyst component for olefin polymerization.

Table 1 shows preferable combinations of the first internal electron donor compound, the second internal electron donor compound, and the third internal electron donor compound when implementing the method for producing a solid catalyst component for olefin polymerization according to one embodiment of the invention.

Specifically, (1) a combination of an alkyl-substituted malonic acid diester, an alkyl-substituted malonic acid diester, and an alkyl-substituted malonic acid diester, (2) a combination of an ether carbonate, an alkyl-substituted malonic acid diester, and an alkyl-substituted malonic acid diester, (3) a combination of an alkyl-substituted malonic acid diester, an alkyl-substituted malonic acid diester, and an ether carbonate, (4) a combination of an alkyl-substituted malonic acid diester, an ether carbonate, and an alkyl-substituted malonic acid diester, (5) a combination of an alkyl-substituted malonic acid diester, an aromatic dicarboxylic acid diester, and an aromatic dicarboxylic acid diester, and (6) a combination of a cycloalkenedicarboxylic acid diester, a cycloalkenedicarboxylic acid diester, and a cycloalkenedicarboxylic acid diester, are preferable as a combination of the first internal electron donor compound, the second internal electron donor compound, and the third internal electron donor compound (see Table 1).

TABLE 1

| | First internal electron donor compound | Second internal electron donor compound | Third internal electron donor compound |
|---|---|---|---|
| (1) | Alkyl-substituted malonic acid diester | Alkyl-substituted malonic acid diester | Alkyl-substituted malonic acid diester |
| (2) | Ether carbonate | Alkyl-substituted malonic acid diester | Alkyl-substituted malonic acid diester |
| (3) | Alkyl-substituted malonic acid diester | Alkyl-substituted malonic acid diester | Ether carbonate |
| (4) | Alkyl-substituted malonic acid diester | Ether carbonate | Alkyl-substituted malonic acid diester |
| (5) | Alkyl-substituted malonic acid diester | Aromatic dicarboxylic acid diester | Aromatic dicarboxylic acid diester |
| (6) | Cycloalkenedicarboxylic acid diester | Cycloalkenedicarboxylic acid diester | Cycloalkenedicarboxylic acid diester |

When any of the above combinations (see (1) to (6)) is used as a combination of the first internal electron donor compound, the second internal electron donor compound, and the third internal electron donor compound when implementing the method for producing a solid catalyst component for olefin polymerization according to one embodiment of the invention, it is possible to easily produce an olefin homopolymer or copolymer that exhibits a high MFR and excellent stereoregularity.

When implementing the method for producing a solid catalyst component for olefin polymerization according to one embodiment of the invention, the contact-reaction operation in the first step may be performed in the presence of a polysiloxane (i.e., third component).

A polysiloxane is a polymer that includes a siloxane linkage (—Si—O—) in the main chain, and is also referred to as "silicone oil". The polysiloxane may be a chain-like, partially hydrogenated, cyclic, or modified polysiloxane that is liquid or viscous at room temperature, and has a viscosity at 25° C. of 0.02 to 100 cm$^2$/s (2 to 10,000 cSt), and preferably 0.03 to 5 cm$^2$/s (3 to 500 cSt).

Examples of the chain-like polysiloxane include disiloxanes such as hexamethyldisiloxane, hexaethyldisiloxane, hexapropyldisiloxane, hexaphenyldisiloxane, 1,3-divinyltetramethyldisiloxane, 1,3-dichlorotetramethyldisiloxane, 1,3-dibromotetramethyldisiloxane, chloromethylpentamethyldisiloxane, 1,3-bis(chloromethyl)tetramethyldisiloxane, dimethylpolysiloxane, and methylphenylpolysiloxane. Examples of the partially hydrogenated polysiloxane include methyl hydrogen polysiloxane having a degree of hydrogenation of 10 to 80%. Examples of the cyclic polysiloxane include hexamethylcyclotrisiloxane, octamethylcyclotetrasiloxane, decamethylcyclopentasiloxane, 2,4,6-trimethylcyclotrisiloxane, and 2,4,6,8-tetramethylcyclotetrasiloxane. Examples of the modified polysiloxane include a higher fatty acid group-substituted dimethylsiloxane, an epoxy group-substituted dimethylsiloxane, and a polyoxyalkylene group-substituted dimethyl-siloxane. Among these, decamethylcyclopentasiloxane and dimethylpolysiloxane are preferable, and decamethylcyclopentasiloxane is particularly preferable.

The magnesium atom content in the solid catalyst component for olefin polymerization obtained by the production method according to one embodiment of the invention is preferably 10 to 70 mass %, more preferably 10 to 50 mass %, more preferably 15 to 40 mass %, and particularly preferably 15 to 25 mass %.

The titanium atom content in the solid catalyst component for olefin polymerization obtained by the production method according to one embodiment of the invention is preferably 0.5 to 8.0 mass %, more preferably 0.5 to 5.0 mass %, and still more preferably 0.5 to 3.0 mass %.

The halogen atom content in the solid catalyst component for olefin polymerization obtained by the production method according to one embodiment of the invention is preferably 20 to 88 mass %, more preferably 30 to 85 mass %, more preferably 40 to 80 mass %, and still more preferably 45 to 75 mass %.

The content of the first internal electron donor compound in the solid catalyst component for olefin polymerization obtained by the production method according to one embodiment of the invention is preferably 0.1 to 30 mass %, more preferably 0.3 to 25 mass %, and particularly preferably 0.5 to 20 mass %.

The content of the second internal electron donor compound in the solid catalyst component for olefin polymerization obtained by the production method according to one embodiment of the invention is preferably 0.1 to 30 mass %, more preferably 0.3 to 20 mass %, and particularly preferably 0.5 to 10 mass %.

The content of the third internal electron donor compound in the solid catalyst component for olefin polymerization obtained by the production method according to one embodiment of the invention is preferably 0.1 to 30 mass %, more preferably 0.3 to 20 mass %, and particularly preferably 0.5 to 10 mass %.

The total content of the first internal electron donor compound, the second internal electron donor compound, and the third internal electron donor compound in the solid catalyst component for olefin polymerization obtained by the production method according to one embodiment of the invention is preferably 1.5 to 30 mass %, more preferably 3.0 to 25 mass %, and particularly preferably 6.0 to 25 mass %.

The solid catalyst component for olefin polymerization obtained by the production method according to one embodiment of the invention exhibits its performance in a well-balanced manner when the magnesium atom content is 15 to 25 mass %, the titanium atom content is 0.5 to 3.0 mass %, the halogen atom content is 45 to 75 mass %, the content of the first internal electron donor compound is 2 to 20 mass %, the content of the second internal electron donor compound is 0.3 to 10 mass %, the content of the third internal electron donor compound is 0.3 to 10 mass %, and the total content of the first internal electron donor compound, the second internal electron donor compound, and the third internal electron donor compound is 6.0 to 25 mass %, for example.

Note that the magnesium atom content in the solid catalyst component refers to a value obtained by dissolving the solid catalyst component in a hydrochloric acid solution, and measuring the magnesium atom content using an EDTA titration method that utilizes an EDTA solution.

The titanium atom content in the solid catalyst component refers to a value measured in accordance with the method (oxidation-reduction titration) specified in JIS M 8311-1997 ("Method for determination of titanium in titanium ores").

The halogen atom content in the solid catalyst component refers to a value obtained by treating the solid catalyst component using a mixture of sulfuric acid and purified water to obtain an aqueous solution, preparatively isolating a given amount of the aqueous solution, and titrating halogen atoms with a silver nitrate standard solution (silver nitrate titration method).

The content of the first internal electron donor compound, the content of the second internal electron donor compound, the content of the third internal electron donor compound, and the total content of the first internal electron donor compound, the second internal electron donor compound, and the third internal electron donor compound in the solid catalyst component refer to values measured as described later.

The embodiments of the invention thus provide a method that can easily produce a novel solid catalyst component for olefin polymerization that achieves excellent olefin polymerization activity and activity with respect to hydrogen during polymerization when homopolymerizing or copolymerizing an olefin, and can produce an olefin polymer that exhibits a high MFR, high stereoregularity, and excellent rigidity while achieving high sustainability of polymerization activity.

Method for Producing Olefin Polymerization Catalyst

An olefin polymerization catalyst according to one embodiment of the invention is described below.

The olefin polymerization catalyst according to one embodiment of the invention is produced by bringing the solid catalyst component for olefin polymerization obtained by the production method according to one embodiment of the invention, an organoaluminum compound represented by the following general formula (I), and an external electron donor compound into contact with each other.

$$R^1_p AlQ_{3-p} \quad (I)$$

wherein $R^1$ is an alkyl group having 1 to 6 carbon atoms, Q is a hydrogen atom or a halogen atom, and p is a real number that satisfies $0 < p \leq 3$.

The details of the solid catalyst component for olefin polymerization according to one embodiment of the invention have been described above.

$R^1$ in the organoaluminum compound represented by the general formula (I) is an alkyl group having 1 to 6 carbon atoms. Specific examples of the alkyl group having 1 to 6 carbon atoms represented by $R^1$ include a methyl group, an ethyl group, a n-propyl group, an isopropyl group, a n-butyl group, a isobutyl group, and the like.

Q in the organoaluminum compound represented by the general formula (I) is a hydrogen atom or a halogen atom. Specific examples of the halogen atom represented by Q include a fluorine atom, a chlorine atom, a bromine atom, and an iodine atom.

Specific examples of the organoaluminum compound represented by the general formula (I) include one or more compounds selected from triethylaluminum, diethylaluminum chloride, triisobutylaluminum, diethylaluminum bromide, and diethylaluminum hydride. Among these, triethylaluminum and triisobutylaluminum are preferable.

Examples of the external electron donor compound used to produce the olefin polymerization catalyst according to one embodiment of the invention include organic compounds that include an oxygen atom or a nitrogen atom. Examples of the organic compounds that include an oxygen atom or a nitrogen atom include alcohols, phenols, ethers, esters, ketones, acid halides, aldehydes, amines, amides, nitriles, isocyanates, and organosilicon compounds. The external electron donor compound may be an organosilicon compound that includes an Si—O—C linkage, an aminosilane compound that includes an Si—N—C linkage, or the like.

Among these, esters such as ethyl benzoate, ethyl p-methoxybenzoate, ethyl p-ethoxybenzoate, methyl p-toluate, ethyl p-toluate, methyl anisate, and ethyl anisate, 1,3-diethers, organosilicon compounds that include an Si—O—C linkage, and aminosilane compounds that include an Si—N—C linkage are preferable, and organosilicon compounds that include an Si—O—C linkage, and aminosilane compounds that include an Si—N—C linkage are particularly preferable.

Examples of the organosilicon compound that includes an Si—O—C linkage and may be used as the external electron donor compound include an organosilicon compound represented by the following general formula (II).

$$R^2_q Si(OR^3)_{4-q} \quad (II)$$

wherein $R^2$ is an alkyl group having 1 to 12 carbon atoms, a cycloalkyl group having 3 to 12 carbon atoms, a phenyl group, a vinyl group, an allyl group, or an aralkyl group, provided that a plurality of $R^2$ are either identical or different when a plurality of $R^2$ are present, $R^3$ is an alkyl group having 1 to 4 carbon atoms, a cycloalkyl group having 3 to 6 carbon atoms, a phenyl group, a vinyl group, an allyl group, or an aralkyl group, provided that a plurality of $R^3$ are either identical or different when a plurality of $R^3$ are present, and q is an integer from 0 to 3.

Examples of the aminosilane compounds that include an Si—N—C linkage and may be used as the external electron donor compound include an organosilicon compound represented by the following general formula (III).

$$(R^4R^5N)_s SiR^6_{(4-s)} \quad (III)$$

wherein $R^4$ and $R^5$ are a hydrogen atom, a linear alkyl group having 1 to 20 carbon atoms, a branched alkyl group having 3 to 20 carbon atoms, a vinyl group, an allyl group, an aralkyl group, a cycloalkyl group having 3 to 20 carbon atoms, or an aryl group, provided that $R^4$ and $R^5$ are either identical or different, and optionally bond to each other to form a ring, $R^6$ is a linear alkyl group having 1 to 20 carbon atoms, a branched alkyl group having 3 to 20 carbon atoms, a vinyl group, an allyl group, an aralkyl group, a linear or branched alkoxy group having 1 to 20 carbon atoms, a vinyloxy group, an allyloxy group, a cycloalkyl group having 3 to 20 carbon atoms, an aryl group, or an aryloxy group, provided that a plurality of $R^6$ are either identical or different when a plurality of $R^6$ are present, and s is an integer from 1 to 3.

Examples of the organosilicon compound represented by the general formula (II) or (III) include phenylalkoxysilanes, alkylalkoxysilanes, phenylalkylalkoxysilanes, cycloalkylalkoxysilanes, alkyl(cycloalkyl)alkoxysilanes, (alkylamino)alkoxysilanes, alkyl(alkylamino)alkoxysilanes, cycloalkyl(alkylamino)alkoxysilanes, tetraalkoxysilanes, tetrakis(alkylamino)silanes, alkyltris(alkylamino)silanes, dialkylbis(alkylamino)silanes, trialkyl(alkylamino)silanes, and the like. Specific examples of the organosilicon compound represented by the general formula (II) or (III) include n-propyltriethoxysilane, cyclopentyltriethoxysilane, phenyltrimethoxysilane, phenyltriethoxysilane, t-butyltrimethoxysilane, diisopropyldimethoxysilane, isopropylisobutyldimethoxysilane, diisopentyldimethoxysilane, bis(2-ethylhexyl)dimethoxysilane, t-butylmethyldimethoxysilane, t-butylethyldimethoxysilane, dicyclopentyldimethoxysilane, dicyclohexyldimetoxysilane, cyclohexylcyclopentyldimethoxysilane, cyclohexylmethyldimethoxysilane, tetraethoxysilane, tetrabutoxysilane, bis(ethylamino)methylethylsilane, bis(ethylamino)-t-butylmethylsilane, bis(ethylamino)dicyclohexylsilane, dicyclopentylbis(ethylamino)silane, bis(methylamino)(methylcyclopentylamino)methylsilane, diethylaminotriethoxysilane, bis(cyclohexylamino)dimethoxysilane, bis(perhydroisoquinolino)dimethoxysilane, bis(perhydroquinolino)dimethoxysilane, ethyl(isoquinolino)dimethoxysilane, and the like. For example, one or more compounds selected from n-propyltriethoxysilane, phenyltrimethoxysilane, t-butylmethyldimethoxysilane, t-butylethyldimethoxysilane, diisopropyldimethoxysilane, isopropylisobutyldimethoxysilane, diisopentyldimethoxysilane, diphenyldimethoxysilane, dicyclopentyldimethoxysilane, cyclohexylmethyldimethoxysilane, tetramethoxysilane, tetraethoxysilane, t-butylmethylbis(ethylamino)silane, bis(ethylamino)dicyclohexylsilane, dicyclopentylbis(ethylamino)silane, bis(perhydroisoquinolino)dimethoxysilane, diethylaminotriethoxysilane, and the like may be used.

The solid catalyst component for olefin polymerization obtained by the production method according to one embodiment of the invention, the organoaluminum compound, and the external electron donor compound may be used to produce the olefin polymerization catalyst according to one embodiment of the invention in an arbitrary ratio as long as the advantageous effects of the invention can be achieved. The organoaluminum compound is preferably used in an amount of 1 to 2000 mol, and more preferably 50 to 1000 mol, per mol of the titanium atoms included in the solid catalyst component for olefin polymerization obtained by the production method according to one embodiment of the invention. The external electron donor compound is preferably used in an amount of 0.002 to 10 mol, more preferably 0.01 to 2 mol, and still more preferably 0.01 to 0.5 mol, per mol of the organoaluminum compound.

The olefin polymerization catalyst according to one embodiment of the invention may be produced by bringing (α) the solid catalyst component for olefin polymerization obtained by the production method according to one embodiment of the invention, (β) the organoaluminum compound, and (γ) the external electron donor compound into contact with each other using a known method.

The components may be brought into contact with each other in an arbitrary order. For example, the components may be brought into contact with each other in any of the orders shown below.

(i) Solid catalyst component (α)→external electron donor compound (γ)→organoaluminum compound (β)
(ii) Organoaluminum compound (β)→external electron donor compound (γ)→solid catalyst component (α)
(iii) External electron donor compound (γ)→solid catalyst component (α)→organoaluminum compound (β)
(iv) External electron donor compound (γ)→organoaluminum compound (β)→solid catalyst component (α)

It is preferable to bring the components into contact with each other according to the contact order example (ii).

Note that the symbol "→" in the contact order examples (i) to (iv) indicates the contact order. For example, "solid catalyst component (α)→organoaluminum compound (β)→external electron donor compound (γ)" means that the organoaluminum compound (β) is brought into contact with (added to) the solid catalyst component (α), and the external electron donor (γ) is brought into contact with the mixture.

The olefin polymerization catalyst according to one embodiment of the invention may be produced by bringing the solid catalyst component for olefin polymerization obtained by the production method according to one embodiment of the invention, the organoaluminum compound, and the external electron donor compound into contact with each other in the absence of an olefin, or may be produced by bringing the solid catalyst component for olefin polymerization obtained by the production method according to one embodiment of the invention, the organoaluminum compound, and the external electron donor compound into contact with each other in the presence of an olefin (i.e., in the polymerization system).

The embodiments of the invention thus provide a novel olefin polymerization catalyst that achieves excellent olefin polymerization activity and activity with respect to hydrogen during polymerization when homopolymerizing or copolymerizing an olefin, and can produce an olefin polymer that exhibits a high MFR, high stereoregularity, and excellent rigidity while achieving high sustainability of polymerization activity.

A method for producing an olefin polymer according to one embodiment of the invention is described below.

The method for producing an olefin polymer according to one embodiment of the invention includes polymerizing an olefin in the presence of the olefin polymerization catalyst according to one embodiment of the invention.

The olefin may be homopolymerized, or copolymerized with another olefin. The olefin is preferably copolymerized with another olefin.

The olefin that is polymerized using the method for producing an olefin polymer according to one embodiment of the invention may be one or more olefins selected from ethylene, propylene, 1-butene, 1-pentene, 4-methyl-1-pentene, vinylcyclohexane, and the like. Among these, ethylene, propylene, and 1-butene are preferable, and propylene is more preferable.

Propylene may be copolymerized with another olefin. It is preferable to subject propylene and another α-olefin to block copolymerization. A block copolymer obtained by block copolymerization is a polymer that includes two or more segments in which the monomer composition changes sequentially. A block copolymer obtained by block copolymerization has a structure in which two or more polymer chains (segments) that differ in polymer primary structure (e.g., type of monomer, type of comonomer, comonomer composition, comonomer content, comonomer arrangement, and stereoregularity) are linked within one molecular chain.

The olefin that is copolymerized with propylene is preferably an α-olefin having 2 to 20 carbon atoms (excluding propylene having 3 carbon atoms). Specific examples of the olefin include ethylene, 1-butene, 1-pentene, 4-methyl-1-pentene, vinylcyclohexane, and the like. These olefins may be used either alone or in combination. In particular, ethylene and 1-butene are preferably used.

The olefin may be polymerized using the method for producing an olefin polymer according to one embodiment of the invention in the presence or absence of an organic solvent.

The olefin may be polymerized in a gaseous state or a liquid state.

The olefin is polymerized in a reactor (e.g., autoclave) in the presence of the olefin polymerization catalyst according to one embodiment of the invention with heating and pressurizing, for example.

When implementing the method for producing an olefin polymer according to one embodiment of the invention, the polymerization temperature is normally 200° C. or less. The polymerization temperature is preferably 100° C. or less, more preferably 60 to 100° C., and still more preferably 70 to 90° C., from the viewpoint of improving activity and stereoregularity. When implementing the method for producing an olefin polymer according to one embodiment of the invention, the polymerization pressure is preferably 10 MPa or less, and more preferably 5 MPa or less.

A continuous polymerization method or a batch polymerization method may be used. The olefin may be polymerized in a single step, or may be polymerized in two or more steps.

When implementing the method for producing an olefin polymer according to one embodiment of the invention, block copolymerization of propylene and another olefin may normally be effected by polymerizing propylene, or copolymerizing propylene and a small amount of α-olefin (e.g., ethylene) in the first step, and copolymerizing propylene and an α-olefin (e.g., ethylene) in the second step in the presence of the olefin polymerization catalyst according to one embodiment of the invention. Note that the first-step polymerization reaction may be repeatedly effected a plurality of times, and the second-step polymerization reaction may be repeatedly effected a plurality of times (i.e., multistep reaction).

More specifically, block copolymerization of propylene and another olefin may be effected by effecting first-step polymerization while adjusting the polymerization temperature and the polymerization time so that the resulting polypropylene part accounts for 20 to 90 wt % of the final copolymer, introducing propylene and ethylene or another α-olefin in the second step, and polymerizing the components so that the rubber part (e.g., ethylene-propylene rubber (EPR)) accounts for 10 to 80 wt % of the final copolymer.

The polymerization temperature in the first step and the second step is preferably 200° C. or less, and more preferably 100° C. or less. The polymerization pressure in the first step and the second step is preferably 10 MPa or less, and more preferably 5 MPa or less.

The copolymerization reaction may be effected using a continuous polymerization method or a batch polymerization method. The polymerization reaction may be effected in one step, or may be effected in two or more steps.

The polymerization time (i.e., the residence time in the reactor) in each polymerization step, or the polymerization time when using a continuous polymerization method, is preferably 1 minute to 5 hours.

Examples of the polymerization method include a slurry polymerization method that utilizes an inert hydrocarbon solvent such as cyclohexane or heptane, a bulk polymerization method that utilizes a solvent such as liquefied propylene, and a gas-phase polymerization method in which a solvent is not substantially used. Among these, a bulk polymerization method and a gas-phase polymerization method are preferable. It is preferable to use a gas-phase polymerization method in the second step in order to suppress elution from the polypropylene (PP) particles included in EPR.

When implementing the method for producing an olefin polymer according to one embodiment of the invention, preliminary polymerization may be effected by bringing part or all of the components of the olefin polymerization catalyst according to one embodiment of the invention into contact with the olefin before polymerizing the olefin (hereinafter may be appropriately referred to as "main polymerization").

The components of the olefin polymerization catalyst according to one embodiment of the invention may be brought into contact with the olefin in an arbitrary order when effecting the preliminary polymerization. It is preferable to add the organoaluminum compound to a preliminary polymerization system that contains an inert gas atmosphere or an olefin gas atmosphere, add the solid catalyst component for olefin polymerization according to one embodiment of the invention to the preliminary polymerization system, and bring one or more olefins (e.g., propylene) into contact with the mixture. It is also preferable to add the organoaluminum compound to a preliminary polymerization system that contains an inert gas atmosphere or an olefin gas atmosphere, add the external electron donor compound to the preliminary polymerization system, add the solid catalyst component for olefin polymerization according to one embodiment of the invention to the preliminary polymerization system, and bring one or more olefins (e.g., propylene) into contact with the mixture.

The olefin subjected to the main polymerization, or a monomer such as styrene may be used for the preliminary polymerization. The preliminary polymerization conditions may be the same as the above polymerization conditions.

It is possible to improve the catalytic activity, and easily improve the stereoregularity, the particle properties, and the like of the resulting polymer by effecting the preliminary polymerization.

The embodiments of the invention thus provide a novel method that can produce an olefin polymer that exhibits a high MFR, high stereoregularity, and excellent rigidity while achieving high sustainability of polymerization activity.

The invention is further described below by way of examples. Note that the following examples are for illustration purposes only, and the invention is not limited to the following examples.

In the examples and comparative examples, the sphericity of the dialkoxymagnesium particles, and the content of magnesium atoms, titanium atoms, halogen atoms, and the internal electron donor compound in the solid catalyst component were measured as described below.

Sphericity of Dialkoxymagnesium Particles

The sphericity of the dialkoxymagnesium particles was determined by photographing the dialkoxymagnesium particles using a scanning electron microscope ("JSM-7500F" manufactured by JEOL Ltd.) at a magnification at which 500 to 1000 dialkoxymagnesium particles were displayed on a screen, randomly sampling 500 or more dialkoxymagnesium particles from the photographed dialkoxymagnesium particles, determining the area S and the circumferential length L of each dialkoxymagnesium particle using image analysis software ("MacView Ver. 4.0" manufactured by MOUN-TECH Co., Ltd.), calculating the sphericity of each dialkoxymagnesium particle using the following expression, and calculating the arithmetic mean value thereof.

Sphericity of each dialkoxymagnesium particle=$\frac{4\pi \times S}{L^2}$

Content of Magnesium Atoms in Solid Catalyst Component

The solid catalyst component from which the solvent component had been completely removed by heating (drying) under reduced pressure was weighed, and dissolved in a hydrochloric acid solution. After the addition of methyl orange (indicator) and a saturated ammonium chloride solution, the mixture was neutralized with aqueous ammonia, heated, cooled, and filtered to remove a precipitate (titanium hydroxide). A given amount of the filtrate was isolated preparatively, and heated. After the addition of a buffer and an EBT mixed indicator, magnesium atoms were titrated using an EDTA solution to determine the content of magnesium atoms in the solid catalyst component (EDTA titration method).

Content of Titanium Atoms in Solid Catalyst Component

The content of titanium atoms in the solid catalyst component was determined in accordance with the method (oxidation-reduction titration) specified in JIS M 8311-1997 ("Method for determination of titanium in titanium ores").

Content of Halogen Atoms in Solid Catalyst Component

The solid catalyst component from which the solvent component had been completely removed by heating (drying) under reduced pressure was weighed, and treated with a mixture of sulfuric acid and purified water to obtain an aqueous solution. A given amount of the aqueous solution was isolated preparatively, and halogen atoms were titrated with a silver nitrate standard solution using an automatic titration device ("COM-1500" manufactured by Hiranuma Sangyo Co., Ltd.) to determine the content of halogen atoms in the solid catalyst component (silver nitrate titration method).

Content of Internal Electron Donor Compound in Solid Catalyst Component

The content of the internal electron donor compound (first internal electron donor compound, second internal electron donor compound, and third internal electron donor compound) in the solid catalyst component was determined using a gas chromatograph ("GC-14B" manufactured by Shimadzu Corporation) under the following conditions. The number of moles of each component (each internal electron donor compound) was calculated from the gas chromatography measurement results using a calibration curve that was drawn in advance using the measurement results at a known concentration.

Measurement Conditions

Column: packed column (2.6 (diameter)×2.1 m, Silicone SE-30 10%, Chromosorb WAW DMCS 80/100, manufactured by GL Sciences Ltd.)
Detector: flame ionization detector (FID)
Carrier gas: helium, flow rate: 40 ml/min
Measurement temperature: vaporization chamber: 280° C., column: 225° C., detector: 280° C., or vaporization chamber: 265° C., column: 180° C., detector: 265° C.

Example 1

Production of Solid Catalyst Component (1) First Step

A 500 ml round bottom flask equipped with a stirrer in which the internal atmosphere had been sufficiently replaced by nitrogen gas, was charged with 40 ml (364 mmol) of titanium tetrachloride and 60 ml (565 mmol) of toluene to prepare a solution.

A suspension prepared using 20 g (175 mmol) of spherical diethoxymagnesium (sphericity: 1.10), 80 ml (753 mmol) of toluene, and 4.4 ml (15.5 mmol) of diethyl diisobutylmalonate was added to the solution. The mixture was stirred at −5° C. for 1 hour, and heated to 110° C. 4.4 ml (15.5 mmol) of diethyl diisobutylmalonate was added stepwise to the mixture while heating the mixture. After reacting the mixture at 110° C. for 2 hours with stirring, the reaction mixture was allowed to stand, and the supernatant liquid was removed to obtain a reaction product slurry.

After the addition of 187 ml of toluene (100° C.) to the reaction product slurry, the mixture was stirred and allowed to stand, and the supernatant liquid was removed. This operation was repeated four times to wash the reaction product to obtain a reaction product slurry including a solid component (I).

(2) Second Step 170 ml (1600 mmol) of toluene and 30 ml (273 mmol) of titanium tetrachloride were added to the reaction product slurry including the solid component (I). The mixture was heated to 110° C., and reacted for 2 hours with stirring. After completion of the reaction, the supernatant liquid (toluene) was removed. After the addition of 180 ml of toluene and 20 ml (182 mmol) of titanium tetrachloride, the mixture was heated. After the addition of 0.8 ml (3.2 mmol) of dimethyl diisobutylmalonate, the mixture was reacted at 110° C. for 2 hours with stirring. The resulting reaction mixture was allowed to stand, and the supernatant liquid was removed to obtain a reaction product slurry.

After completion of the reaction, 187 ml of toluene (100° C.) was added to the reaction product slurry, the mixture was stirred and allowed to stand, and the supernatant liquid was removed. This operation was repeated twice. After the addition of 150 ml of n-heptane (60° C.), the mixture was stirred and allowed to stand, and the supernatant liquid was removed. This operation was repeated five times to wash the reaction product to obtain a reaction product slurry including a solid component (II).

(3) Third Step 150 ml (1024 mmol) of heptane was added to the reaction product slurry including the solid component (II) to adjust the concentration of titanium tetrachloride in the reaction mixture to 0.2 mass %, and the mixture was heated. After the addition of 0.8 ml (3.2 mmol) of dimethyl diisobutylmalonate, the mixture was reacted at 80° C. for 1 hour with stirring. The resulting reaction mixture was allowed to stand, and the supernatant liquid was removed to obtain a reaction product slurry.

After the addition of 150 ml of n-heptane (60° C.) to the reaction product slurry, the mixture was stirred and allowed to stand, and the supernatant liquid was removed. This operation was repeated twice to wash the reaction product to obtain about 20 g of a solid catalyst component (A1) for olefin polymerization.

The solid catalyst component (A1) had a magnesium atom content of 18.8 mass %, a titanium atom content of 2.5 mass %, a halogen atom content of 61.0 mass %, a total carboxylic acid diester content of 17.6 mass %, and a dimethyl diisobutylmalonate content of 6.1 mass %.

Preparation of Polymerization Catalyst and Polymerization of Propylene

An autoclave (internal volume: 2.0 l) equipped with a stirrer in which the internal atmosphere had been completely replaced by nitrogen gas, was charged with 1.32 mmol of triethylaluminum, 0.13 mmol of dicyclopentyldimethoxysilane (DCPDMS), and the solid catalyst component (A1) (0.0013 mmol on a titanium atom basis) to prepare an olefin polymerization catalyst.

The autoclave was charged with 4.0 l of hydrogen gas and 1.4 l of liquefied propylene. The liquefied propylene was subjected to preliminary polymerization at 20° C. for 5 minutes under a pressure of 1.1 MPa, heated, and polymerized at 70° C. for 1 hour under a pressure of 3.5 MPa to obtain a propylene polymer (polypropylene).

The polymerization activity per gram of the solid catalyst component, the p-xylene-soluble content (XS) in the resulting polymer, the melt flow rate (MFR) of the polymer, the isotactic pentad fraction (NMR-mmmm) of the polymer, and the flexural modulus (FM) of the polymer were measured as described below. The results are shown in Table 2.

Polymerization Activity

The polymerization activity per gram of the solid catalyst component was calculated using the following expression.

Polymerization activity (g-pp/g-catalyst)=mass (g) of polymer/mass (g) of solid catalyst component included in olefin polymerization catalyst Xylene-Soluble Content (XS) in Polymer A flask equipped with a stirrer was charged with 4.0 g of the polymer (polypropylene) and 200 ml of p-xylene. The external temperature was increased to be equal to or higher than the boiling point (about 150° C.) of xylene, and the polymer was dissolved over 2 hours while maintaining p-xylene contained in the flask at a temperature (137 to 138° C.) under the condition of boiling point. The solution was cooled to 23° C. over 1 hour, and an insoluble component and a soluble component were separated by filtration. A solution of the soluble component was collected, and p-xylene was evaporated by heating (drying) under reduced pressure. The weight of the residue was determined, and the relative ratio (mass %) with respect to the polymer (propylene) was calculated to determine the xylene-soluble content (XS).

Melt Flow Rate (MFR) of Polymer

The melt flow rate (MFR) (melt flow index) (g/10 min) of the polymer was measured in accordance with ASTM D1238 (JIS K 7210).

Isotactic Pentad Fraction (NMR-mmmm) of Polymer

The term "isotactic pentad fraction (NMR-mmmm)" refers to the fraction (%) of a propylene monomer unit situated at the center of an isotactic chain (i.e., a chain in which five propylene monomer units are sequentially meso-linked) of a pentad unit in a polypropylene molecular chain that is measured by the method described in A. Zambelli et al., Macromolecules, 6, 925 (1973). The isotactic pentad fraction (NMR-mmmm) is calculated using $^{13}$C-NMR. The area fraction of the mmmm peak with respect to the total absorption peaks in the methyl-carbon region of the $^{13}$C-NMR spectrum was calculated, and taken as the isotactic pentad fraction.

The isotactic pentad fraction (NMR-mmmm) of the polymer was determined by performing $^{13}$C-NMR measurement using an NMR device ("JNM-ECA400" manufactured by JEOL Ltd.) under the following conditions.

$^{13}$C-NMR Measurement Conditions
Measurement mode: proton decoupling method
Pulse width: 7.25 μsec
Pulse repetition time: 7.4 sec
Integration count: 10,000
Solvent: tetrachloroethane-d2
Sample concentration: 200 mg/3.0 ml Flexural Modulus (FM) of Polymer The polymer was injection-molded to prepare a property measurement specimen. The specimen was conditioned in a temperature-controlled room maintained at 23° C. for 144 hours or more, and in accordance with JIS K 7171, the flexural modulus (FM) (MPa) was measured using the specimen provided that a liquid/powder exudate was not observed on the surface thereof.

Preparation of Copolymerization Catalyst and Ethylene-Propylene Block Copolymerization A copolymerization catalyst was prepared as described below using the solid catalyst component, and a copolymer was produced by multistep polymerization as described below. The ethylene-propylene block copolymerization activity (ICP (impact copolymer) activity) during copolymerization was measured to evaluate the sustainability of polymerization activity, and the block ratio, the flexural modulus (FM), and the Izod impact strength of the resulting ethylene-propylene block copolymer were measured.

An autoclave (internal volume: 2.0 l) equipped with a stirrer in which the internal atmosphere had been completely replaced by nitrogen gas, was charged with 2.4 mmol of triethylaluminum, 0.24 mmol of dicyclopentyldimethoxysilane (DCPDMS), and the solid catalyst component (A1) (0.003 mmol on a titanium atom basis) to prepare an ethylene-propylene copolymerization catalyst (B1).

An autoclave equipped with a stirrer was charged with 10.2 mg of the ethylene-propylene copolymerization catalyst (B1), and further charged with liquefied propylene (15 mol) and hydrogen gas (partial pressure: 0.20 MPa). The liquefied propylene was subjected to preliminary polymerization at 20° C. for 5 minutes, and subjected to first-step homopropylene polymerization (homopolymerization) at 70° C. for 75 minutes. The pressure inside the autoclave was then returned to normal pressure.

After feeding ethylene, propylene, and hydrogen to the autoclave in a molar ratio of 1.0/1.0/0.043, the mixture was heated to 70° C., and reacted at 70° C. for 1 hour under a pressure of 1.2 MPa while feeding ethylene, propylene, and hydrogen in a ratio of 2/2/0.086 (l/min) to obtain an ethylene-propylene copolymer.

The ethylene-propylene block copolymerization activity (ICP activity) (kg-ICP/(g-cat·hr)), the block ratio (mass %), and the Izod impact strength of the ethylene-propylene copolymer were measured as described below, and the flexural modulus (FM) of the ethylene-propylene copolymer was measured as described above. The results are shown in Table 3.

Ethylene-Propylene Block Copolymerization Activity (ICP Activity) (g-ICP/(g-cat·hr))

The ethylene-propylene block copolymerization activity (ICP activity) when producing the ethylene-propylene block copolymer was calculated using the following expression. The results are shown in Table 3.

Ethylene-propylene block copolymerization activity (ICP activity) (kg-ICP/(g-cat·hr))=((I(kg)−G(g))/ mass (g) of solid catalyst component included in olefin polymerization catalyst)/1.0 (hr)

Note that I is the mass (g) of the autoclave after completion of copolymerization, and G is the mass (g) of the autoclave after unreacted monomers had been removed after completion of homo-PP polymerization.

Block Ratio (Mass %)

The block ratio of the copolymer was calculated using the following expression. The results are shown in Table 3.

Block ratio (mass %)={(I(g)−G(g))/(I(g)−F(g))}×100

Note that I is the mass (g) of the autoclave after completion of copolymerization, G is the mass (g) of the autoclave after unreacted monomers had been removed after completion of homo-PP polymerization, and F is the mass (g) of the autoclave.

Izod Impact Strength 0.10 wt % of IRGANOX 1010 (manufactured by BASF), 0.10 wt % of IRGAFOS 168 (manufactured by BASF), and 0.08 wt % of calcium stearate were added to the ethylene-propylene copolymer, and the mixture was kneaded and granulated using a single-screw extruder to obtain pellets of the ethylene-propylene copolymer.

The pellets of the ethylene-propylene copolymer were introduced into an injection molding machine (mold temperature: 60° C., cylinder temperature: 230° C.), and injection-molded to prepare a property measurement specimen.

The specimen was conditioned in a temperature-controlled room maintained at 23° C. for 144 hours or more, and the Izod impact strength (23° C. and −30° C.) of the specimen was measured in accordance with JIS K 7110 ("Method of Izod Impact Test For Rigid Plastics") using an Izod tester ("Model A-121804405" manufactured by Toyo Seiki Seisaku-Sho, Ltd.).

Shape of specimen: ISO 180/4A, thickness: 3.2 mm, width: 12.7 mm, length: 63.5 mm
Shape of notch: type-A notch (radius: 0.25 mm) formed using a die provided with a notch
Temperature: 23° C. and −30° C.
Impact speed: 3.5 m/s
Nominal pendulum energy: 5.5 J (23° C.) and 2.75 J (−30° C.)

Example 2

A solid catalyst component (A2) was produced in the same manner as in Example 1, except that the amount of dimethyl diisobutylmalonate added in the second step (see (2)) was changed from 0.8 ml (3.2 mmol) to 0.4 ml (1.6 mmol), and the amount of dimethyl diisobutylmalonate added in the third step (see (3)) was changed from 0.8 ml (3.2 mmol) to 0.4 ml (1.6 mmol).

The solid catalyst component (A2) had a magnesium atom content of 18.7 mass %, a titanium atom content of 2.6 mass %, a halogen atom content of 61.4 mass %, a total carboxylic acid diester content of 16.7 mass %, and a dimethyl diisobutylmalonate content of 3.0 mass %.

A propylene polymerization catalyst and an ethylene-propylene copolymerization catalyst were prepared in the same manner as in Example 1 using the solid catalyst component (A2), and polypropylene and an ethylene-propylene block copolymer were produced in the same manner as in Example 1. The propylene polymerization activity, the ethylene-propylene block copolymerization activity (ICP activity), and the resulting polymers were evaluated in the same manner as described above. The results are shown in Tables 2 and 3.

Example 3

A propylene polymerization catalyst and an ethylene-propylene copolymerization catalyst were prepared in the same manner as in Example 1 using the solid catalyst component (A1) obtained in Example 1, except that 0.13 mmol or 0.24 mmol of diethylaminotriethoxysilane (DEATES) was used instead of 0.13 mmol or 0.24 mmol of dicyclopentyldimethoxysilane (DCPDMS), and polypropylene and an ethylene-propylene block copolymer were produced in the same manner as in Example 1. The propylene polymerization activity, the ethylene-propylene block copolymerization activity (ICP activity), and the resulting polymers were evaluated in the same manner as described above. The results are shown in Tables 2 and 3.

Example 4

A propylene polymerization catalyst and an ethylene-propylene copolymerization catalyst were prepared in the same manner as in Example 1 using the solid catalyst component (A1) obtained in Example 1, except that 0.13 mmol or 0.24 mmol of dicyclopentylbis(ethylamino)silane (DCPEAS) was used instead of 0.13 mmol or 0.24 mmol of dicyclopentyldimethoxysilane (DCPDMS), and polypropylene and an ethylene-propylene block copolymer were produced in the same manner as in Example 1. The propylene polymerization activity, the ethylene-propylene block copolymerization activity (ICP activity), and the resulting polymers were evaluated in the same manner as described above. The results are shown in Tables 2 and 3.

Comparative Example 1

A solid catalyst component was produced as described below without performing the third step.

(1) First Step

A 500 ml round bottom flask equipped with a stirrer in which the internal atmosphere had been sufficiently replaced by nitrogen gas, was charged with 40 ml (364 mmol) of titanium tetrachloride and 60 ml (565 mmol) of toluene to prepare a solution.

A suspension prepared using 20 g (175 mmol) of spherical diethoxymagnesium (sphericity: 1.10), 80 ml (753 mmol) of toluene, and 4.4 ml (15.5 mmol) of diethyl diisobutylmalonate was added to the solution. The mixture was stirred at −5° C. for 1 hour. The mixture was heated to 110° C. while adding 4.4 ml (15.5 mmol) of diethyl diisobutylmalonate, and the resulting mixture was reacted for 2 hours with stirring. The resulting reaction mixture was allowed to stand, and the supernatant liquid was removed to obtain a reaction product slurry.

After the addition of 187 ml of toluene (100° C.) to the reaction product slurry, the mixture was stirred and allowed to stand, and the supernatant liquid was removed. This operation was repeated four times to wash the reaction product to obtain a reaction product slurry including a solid component (I).

(2) Second Step

After the addition of 20 ml of titanium tetrachloride, 47 ml of toluene, and 1.6 ml (6.5 mmol) of dimethyl diisobutylmalonate to the reaction product slurry including a solid component (I) obtained by the first step, the mixture was heated to 100° C., and reacted for 2 hours with stirring. After completion of the reaction, the supernatant liquid (toluene) was removed. The solid product in a wet state was washed four times with 87 ml of toluene (100° C.), and washed ten times with 67 ml of n-heptane (40° C.) to obtain a solid catalyst component (a1).

The solid catalyst component (a1) had a magnesium atom content of 17.4 mass %, a titanium atom content of 3.7 mass %, a halogen atom content of 59.5 mass %, a total carboxylic acid diester content of 19.2 mass %, and a dimethyl diisobutylmalonate content of 6.4 mass %.

Preparation of Polymerization Catalyst and Polymerization of Propylene

Polypropylene and an ethylene-propylene block copolymer were produced in the same manner as in Example 1, except that the solid catalyst component (a1) was used instead of the solid catalyst component (A1), and the propylene polymerization activity, the ethylene-propylene block copolymerization activity (ICP activity), and the resulting polymers were evaluated in the same manner as described above. The results are shown in Tables 2 and 3.

Comparative Example 2

A solid catalyst component was produced as described below without performing the second step.
(1) First Step A 500 ml round bottom flask equipped with a stirrer in which the internal atmosphere had been sufficiently replaced by nitrogen gas, was charged with 40 ml (364 mmol) of titanium tetrachloride and 60 ml (565 mmol) of toluene to prepare a solution.

A suspension prepared using 20 g (175 mmol) of spherical diethoxymagnesium (sphericity: 1.10), 80 ml (753 mmol) of toluene, and 4.4 ml (15.5 mmol) of diethyl diisobutylmalonate was added to the solution. The mixture was stirred at −5° C. for 1 hour. The mixture was heated to 110° C. while adding 4.4 ml (15.5 mmol) of diethyl diisobutylmalonate, and the resulting mixture was reacted for 2 hours with stirring. The resulting reaction mixture was allowed to stand, and the supernatant liquid was removed to obtain a reaction product slurry.

After the addition of 187 ml of toluene (100° C.) to the reaction product slurry, the mixture was stirred and allowed to stand, and the supernatant liquid was removed. This operation was repeated four times to wash the reaction product to obtain a reaction product slurry including a solid component (I).
(2) Third Step 150 ml of heptane was added to the reaction product slurry including the solid component (I) obtained by the first step to adjust the concentration of titanium tetrachloride in the reaction mixture to 0.2 mass %, and the mixture was heated. After the addition of 1.6 ml (6.4 mmol) of dimethyl diisobutylmalonate, the mixture was reacted at 80° C. for 1 hour with stirring. The resulting reaction mixture was allowed to stand, and the supernatant liquid was removed to obtain a reaction product slurry. After the addition of 150 ml of n-heptane (60° C.) to the reaction product slurry, the mixture was stirred and allowed to stand, and the supernatant liquid was removed. This operation was repeated twice to wash the reaction product to obtain about 20 g of a solid catalyst component (a2) for olefin polymerization.

The solid catalyst component (a2) had a magnesium atom content of 16.4 mass %, a titanium atom content of 4.2 mass %, a halogen atom content of 59.0 mass %, a total carboxylic acid diester content of 20.1 mass %, and a dimethyl diisobutylmalonate content of 7.4 mass %.
Preparation of Polymerization Catalyst and Polymerization of Propylene Polypropylene and an ethylene-propylene block copolymer were produced in the same manner as in Example 1, except that the solid catalyst component (a2) was used instead of the solid catalyst component (A1), and the propylene polymerization activity, the ethylene-propylene block copolymerization activity (ICP activity), and the resulting polymers were evaluated in the same manner as described above. The results are shown in Tables 2 and 3.

Example 5

A solid catalyst component (A3) was produced in the same manner as in Example 2, except that diethyl phthalate (1.6 mmol) was added in the third step as the third internal electron donor compound instead of 0.4 ml (1.6 mmol) of dimethyl diisobutylmalonate.

The solid catalyst component (A3) had a magnesium atom content of 18.7 mass %, a titanium atom content of 1.4 mass %, a halogen atom content of 61.6 mass %, a total content of a phthalic acid diester and a diisobutylmalonic acid diester of 16.9 mass %, and a diisobutylmalonic acid diester content of 14.6 mass %.

Polypropylene and an ethylene-propylene block copolymer were produced in the same manner as in Example 1, except that the solid catalyst component (A3) was used, and the propylene polymerization activity, the ethylene-propylene block copolymerization activity (ICP activity), and the resulting polymers were evaluated in the same manner as described above. The results are shown in Tables 2 and 3.

Example 6

A solid catalyst component (A4) was produced in the same manner as in Example 1, except that di-n-propyl phthalate (3.2 mmol) was added in the third step as the third internal electron donor compound instead of 0.8 ml (3.2 mmol) of dimethyl diisobutylmalonate.

The solid catalyst component (A4) had a magnesium atom content of 19.0 mass %, a titanium atom content of 1.3 mass %, a halogen atom content of 59.2 mass %, a total content of a phthalic acid diester and a diisobutylmalonic acid diester of 14.6 mass %, and a diisobutylmalonic acid diester content of 12.6 mass %.

Polypropylene and an ethylene-propylene block copolymer were produced in the same manner as in Example 1, except that the solid catalyst component (A4) was used, and the propylene polymerization activity, the ethylene-propylene block copolymerization activity (ICP activity), and the resulting polymers were evaluated in the same manner as described above. The results are shown in Tables 2 and 3.

Example 7

A solid catalyst component (A5) was produced in the same manner as in Example 1, except that diethyl benzylidenemalonate (3.2 mmol) was added in the third step as the third internal electron donor compound instead of 0.8 ml (3.2 mmol) of dimethyl diisobutylmalonate.

The solid catalyst component (A5) had a magnesium atom content of 19.6 mass %, a titanium atom content of 1.8 mass %, a halogen atom content of 62.6 mass %, a total carboxylic acid diester content of 14.9 mass %, a dimethyl diisobutylmalonate content of 2.3 mass %, and a diethyl benzylidenemalonate content of 2.8 mass %.

Polypropylene and an ethylene-propylene block copolymer were produced in the same manner as in Example 1, except that the solid catalyst component (A5) was used, and the propylene polymerization activity, the ethylene-propylene block copolymerization activity (ICP activity), and the resulting polymers were evaluated in the same manner as described above. The results are shown in Tables 2 and 3.

Example 8

A solid catalyst component (A6) was produced in the same manner as in Example 1, except that diethyl benzylidenemalonate (equimolar amount) was added in the first step as the first internal electron donor compound instead of diethyl diisobutylmalonate.

The solid catalyst component (A6) had a magnesium atom content of 19.2 mass %, a titanium atom content of 1.3 mass %, a halogen atom content of 60.0 mass %, a total carboxylic acid diester content of 15.9 mass %, and a dimethyl diisobutylmalonate content of 6.2 mass %.

Polypropylene and an ethylene-propylene block copolymer were produced in the same manner as in Example 1, except that the solid catalyst component (A6) was used, and the propylene polymerization activity, the ethylene-propylene block copolymerization activity (ICP activity), and the resulting polymers were evaluated in the same manner as described above. The results are shown in Tables 2 and 3.

Example 9

A solid catalyst component (A7) was produced in the same manner as in Example 5, except that diethyl benzylidenemalonate (equimolar amount) was added in the first step as the first internal electron donor compound instead of diethyl diisobutylmalonate, and diethyl benzylidenemalonate (equimolar amount) was added in the second step as the second internal electron donor compound instead of dimethyl diisobutylmalonate.

The solid catalyst component (A7) had a magnesium atom content of 20.9 mass %, a titanium atom content of 1.4 mass %, a halogen atom content of 61.6 mass %, a total carboxylic acid diester content of 15.5 mass %, and a diethyl phthalate content of 3.0 mass %.

Polypropylene and an ethylene-propylene block copolymer were produced in the same manner as in Example 1, except that the solid catalyst component (A7) was used, and the propylene polymerization activity, the ethylene-propylene block copolymerization activity (ICP activity), and the resulting polymers were evaluated in the same manner as described above. The results are shown in Tables 2 and 3.

Example 10

A solid catalyst component (A8) was produced in the same manner as in Example 1, except that 2-ethoxyethyl ethyl carbonate (equimolar amount) was added in the first step as the first internal electron donor compound instead of diethyl diisobutylmalonate (8.8 ml (31.2 mmol) in total), di-n-propyl phthalate (equimolar amount) was added in the second step as the second internal electron donor compound instead of 0.8 ml (3.2 mmol) of dimethyl diisobutylmalonate, and di-n-propyl phthalate (equimolar amount) was added in the third step as the third internal electron donor compound instead of 0.8 ml (3.2 mmol) of dimethyl diisobutylmalonate.

The solid catalyst component (A8) had a magnesium atom content of 20.6 mass %, a titanium atom content of 1.2 mass %, a halogen atom content of 63.0 mass %, a total internal electron donor compound content of 12.7 mass %, and a di-n-propyl phthalate content of 6.3 mass %.

Polypropylene and an ethylene-propylene block copolymer were produced in the same manner as in Example 1, except that the solid catalyst component (A8) was used, and the propylene polymerization activity, the ethylene-propylene block copolymerization activity (ICP activity), and the resulting polymers were evaluated in the same manner as described above. The results are shown in Tables 2 and 3.

Example 11

A solid catalyst component (A9) was produced in the same manner as in Example 1, except that 3,3-bis (methoxymethyl)-2,6-dimethylheptane (3,3-BMDMH) (equimolar amount) was added in the first step as the first internal electron donor compound instead of diethyl diisobutylmalonate.

The solid catalyst component (A9) had a magnesium atom content of 19.5 mass %, a titanium atom content of 1.1 mass %, a halogen atom content of 62.9 mass %, a total internal electron donor compound content of 15.9 mass %, and a dimethyl diisobutylmalonate content of 5.8 mass %.

Polypropylene and an ethylene-propylene block copolymer were produced in the same manner as in Example 1, except that the solid catalyst component (A9) was used, and the propylene polymerization activity, the ethylene-propylene block copolymerization activity (ICP activity), and the resulting polymers were evaluated in the same manner as described above. The results are shown in Tables 2 and 3.

Comparative Example 3

A solid catalyst component was produced as described below without performing the second step and the third step (i.e., the second internal electron donor compound and the third internal electron donor compound were added together with the first internal electron donor compound).

A 500 ml round bottom flask equipped with a stirrer in which the internal atmosphere had been sufficiently replaced by nitrogen gas, was charged with 40 ml (364 mmol) of titanium tetrachloride and 60 ml (565 mmol) of toluene to prepare a solution.

A suspension was prepared by mixing and stirring 20 g (175 mmol) of spherical diethoxymagnesium (sphericity: 1.10), 80 ml (753 mmol) of toluene, and 4.0 ml (15.6 mmol) of 3,3-bis(methoxymethyl)-2,6-dimethylheptane, and added to the solution. The mixture was stirred at −5° C. for 1 hour. The mixture was heated to 110° C. while adding 4.4 ml (15.5 mmol) of diethyl diisobutylmalonate, and the resulting mixture was reacted for 2 hours with stirring. The resulting reaction mixture was allowed to stand, and the supernatant liquid was removed to obtain a reaction product slurry.

After the addition of 87 ml of toluene (100° C.) to the reaction product slurry, the mixture was stirred and allowed to stand, and the supernatant liquid was removed. This operation was repeated four times to wash the reaction product. After the addition of 20 ml of titanium tetrachloride and 80 ml of toluene, the mixture was heated to 100° C., and reacted for 2 hours with stirring. The resulting reaction mixture was allowed to stand, and the supernatant liquid was removed to obtain a reaction product slurry including a solid component.

After the addition of 87 ml of toluene (100° C.) to the reaction product slurry, the mixture was stirred and allowed to stand, and the supernatant liquid was removed. This operation was repeated four times to wash the reaction product to obtain a slurry including a solid component. After removing the supernatant liquid (toluene), the solid product in a wet state was washed four times with 87 ml of toluene (100° C.), and washed ten times with 67 ml of n-heptane (40° C.) to obtain a solid catalyst component (a3).

The solid catalyst component (a3) had a magnesium atom content of 19.4 mass %, a titanium atom content of 2.5 mass %, a halogen atom content of 63.3 mass %, a total internal electron donor compound content of 15.2 mass %, and a diethyl diisobutylmalonate content of 7.1 mass %.

Preparation of Polymerization Catalyst and Evaluation of Polymerization

Polypropylene and an ethylene-propylene block copolymer were produced in the same manner as in Example 1, except that the solid catalyst component (a3) was used, and the propylene polymerization activity, the ethylene-propylene block copolymerization activity (ICP activity), and the resulting polymers were evaluated in the same manner as described above. The results are shown in Tables 2 and 3.

TABLE 2

| | Polymerization activity (g-pp/g-cat) | MFR (g/10 min) | XS (mass %) | NMR-mmmm (%) | FM (MPa) |
|---|---|---|---|---|---|
| Example 1 | 54,500 | 52 | 1.5 | — | — |
| Example 2 | 60,200 | 50 | 1.8 | 97.5 | 1530 |
| Example 3 | 55,400 | 240 | 2.3 | 97.6 | 1570 |
| Example 4 | 56,600 | 250 | 2.2 | 97.4 | 1620 |
| Comparative Example 1 | 38,300 | 60 | 3.3 | 95.5 | 1420 |
| Comparative Example 2 | 18,400 | 58 | 3.5 | 95.3 | 1460 |
| Example 5 | 55,700 | 42 | 1.4 | — | — |
| Example 6 | 58,500 | 46 | 1.5 | — | — |
| Example 7 | 51,100 | 50 | 1.2 | — | — |
| Example 8 | 58,600 | 16 | 1.2 | — | — |
| Example 9 | 44,900 | 21 | 0.7 | 98.0 | 1560 |
| Example 10 | 49,000 | 12 | 0.4 | — | — |
| Example 11 | 56,200 | 24 | 0.5 | — | — |
| Comparative Example 3 | 57,700 | 29 | 1.0 | — | — |

TABLE 3

| | ICP polymerization activity (g-ICP/g-cat · hr) | Block ratio (mass %) | FM (MPa) | Izod impact strength (23° C.) (J/m) | Izod impact strength (−30° C.) (J/m) |
|---|---|---|---|---|---|
| Example 1 | 13,200 | 24 | — | — | — |
| Example 2 | 14,600 | 25 | 950 | Did not break | 7.5 |
| Example 3 | 12,000 | 21 | 1100 | 9.8 | 5.7 |
| Example 4 | 18,600 | 29 | 850 | Did not break | 8.6 |
| Comparative Example 1 | 7,900 | 18 | 1120 | 7.2 | 3.9 |
| Comparative Example 2 | 5,600 | 19 | 1090 | 8.0 | 4.1 |
| Example 5 | 10,600 | 23 | — | — | — |
| Example 6 | 14,500 | 25 | — | — | — |
| Example 7 | 13,300 | 24 | — | — | — |
| Example 8 | 12,400 | 22 | — | — | — |
| Example 9 | 12,000 | 21 | 1050 | 16.8 | 6.5 |
| Example 10 | 16,800 | 27 | — | — | — |
| Example 11 | 10,300 | 19 | — | — | — |
| Comparative Example 3 | 6,200 | 13 | — | — | — |

Example 12

Production of Solid Catalyst Component (1) First Step

A 500 ml round bottom flask equipped with a stirrer in which the internal atmosphere had been sufficiently replaced by nitrogen gas, was charged with 40 ml (364 mmol) of titanium tetrachloride and 60 ml (565 mmol) of toluene to prepare a solution.

A suspension prepared using 20 g (175 mmol) of spherical diethoxymagnesium (sphericity: 1.10), 80 ml (753 mmol) of toluene, and 4.4 ml (15.5 mmol) of diethyl diisobutylmalonate was added to the solution. The mixture was stirred at −5° C. for 1 hour, and heated to 110° C. 4.4 ml (15.5 mmol) of diethyl diisobutylmalonate was added stepwise to the mixture while heating the mixture. After reacting the mixture at 110° C. for 2 hours with stirring, the reaction mixture was allowed to stand, and the supernatant liquid was removed to obtain a reaction product slurry.

After the addition of 187 ml of toluene (100° C.) to the reaction product slurry, the mixture was stirred and allowed to stand, and the supernatant liquid was removed. This operation was repeated four times to wash the reaction product to obtain an intermediate composition (I) in the form of a slurry.

(2) Second Step 170 ml (1600 mmol) of toluene and 30 ml (273 mmol) of titanium tetrachloride were added to the intermediate composition (I) in the form of a slurry. The mixture was heated to 110° C., and reacted for 2 hours with stirring. After completion of the reaction, the supernatant liquid (toluene) was removed. After the addition of 180 ml of toluene and 20 ml (182 mmol) of titanium tetrachloride, the mixture was heated while adding 0.2 ml (1.2 mmol) of 2-ethoxyethyl ethyl carbonate. The mixture was then heated to 110° C., and reacted for 2 hours with stirring. The resulting reaction mixture was allowed to stand, and the supernatant liquid was removed to obtain a reaction product slurry.

After the addition of 187 ml of toluene (100° C.) to the reaction product slurry, the mixture was stirred and allowed to stand, and the supernatant liquid was removed. This operation was repeated twice to wash the reaction product to obtain an intermediate composition (II) in the form of a slurry.

(3) Third Step 187 ml (1760 mmol) of toluene was added to the intermediate composition (II) in the form of a slurry to adjust the concentration of titanium tetrachloride in the reaction mixture to 1.3 mass %, and the mixture was heated while adding 0.2 ml (1.2 mmol) of 2-ethoxyethyl ethyl carbonate. The mixture was then heated to 100° C., and reacted at 100° C. for 1 hour with stirring. The resulting reaction mixture was allowed to stand, and the supernatant liquid was removed to obtain a reaction product slurry.

After the addition of 150 ml of n-heptane (60° C.) to the reaction product slurry, the mixture was stirred and allowed to stand, and the supernatant liquid was removed. This operation was repeated seven times to wash the reaction product to obtain about 20 g of a solid catalyst component (A 10) for olefin polymerization.

The solid catalyst component (A10) had a magnesium atom content of 18.8 mass %, a titanium atom content of 2.6 mass %, a halogen atom content of 60.1 mass %, a total content of a carboxylic acid diester and an ether compound of 14.7 mass %, and a 2-ethoxyethyl ethyl carbonate content of 1.3 mass %.

A propylene polymerization catalyst and an ethylene-propylene copolymerization catalyst were prepared in the same manner as in Example 1, except that the solid catalyst component (A10) was used instead of the solid catalyst component (A1), and polypropylene and an ethylene-propylene block copolymer were produced in the same manner as in Example 1. The propylene polymerization activity, the ethylene-propylene block copolymerization activity (ICP activity), and the resulting polymers were evaluated in the same manner as described above.

Example 13

Production of Solid Catalyst Component

A solid catalyst component (A11) was produced in the same manner as in Example 12, except that 3.9 ml (15.8 mmol) of dimethyl diisobutylmalonate was added in the first step (see (1)) instead of 4.4 ml (15.5 mmol) of diethyl diisobutylmalonate.

The solid catalyst component (A11) had a magnesium atom content of 19.0 mass %, a titanium atom content of 2.4 mass %, a halogen atom content of 61.3 mass %, a total content of a carboxylic acid diester and an ether compound of 15.0 mass %, and a 2-ethoxyethyl ethyl carbonate content of 1.2 mass %.

Preparation of Polymerization Catalyst and Polymerization of Propylene

A propylene polymerization catalyst and an ethylene-propylene copolymerization catalyst were prepared in the same manner as in Example 12, except that the solid catalyst component (A11) was used instead of the solid catalyst component (A10), and polypropylene and an ethylene-propylene block copolymer were produced in the same manner as in Example 12. The propylene polymerization activity, the ethylene-propylene block copolymerization activity (ICP activity), and the resulting polymers were evaluated in the same manner as described above. The results are shown in Tables 4 and 5.

Example 14

Production of Solid Catalyst Component

A solid catalyst component (A12) was produced in the same manner as in Example 12, except that 3.5 ml (15.6 mmol) of diethyl benzylidenemalonate was added in the first step (see (1)) instead of 4.4 ml (15.5 mmol) of diethyl diisobutylmalonate.

The solid catalyst component (A12) had a magnesium atom content of 18.0 mass %, a titanium atom content of 2.3 mass %, a halogen atom content of 59.3 mass %, a total content of a carboxylic acid diester and an ether compound of 14.2 mass %, and a 2-ethoxyethyl ethyl carbonate content of 1.4 mass %.

Preparation of Polymerization Catalyst and Polymerization of Propylene

A propylene polymerization catalyst and an ethylene-propylene copolymerization catalyst were prepared in the same manner as in Example 12, except that the solid catalyst component (A12) was used instead of the solid catalyst component (A10), and polypropylene and an ethylene-propylene block copolymer were produced in the same manner as in Example 12. The propylene polymerization activity, the ethylene-propylene block copolymerization activity (ICP activity), and the resulting polymers were evaluated in the same manner as described above. The results are shown in Tables 4 and 5.

TABLE 4

|  | Polymerization activity (g-pp/g-cat) | MFR (g/10 min) | XS (mass %) | NMR-mmmm (%) |
| --- | --- | --- | --- | --- |
| Example 12 | 60,000 | 55 | 0.8 | 97.9 |
| Example 13 | 56,400 | 105 | 0.7 | 98.0 |
| Example 14 | 61,300 | 12 | 0.6 | 98.1 |

TABLE 5

|  | ICP polymerization activity (g-ICP/g-cat · hr) | Block ratio (mass %) |
| --- | --- | --- |
| Example 12 | 12,900 | 24 |
| Example 13 | 14,300 | 25 |
| Example 14 | 12,100 | 22 |

Example 15

A solid catalyst component (A13) was produced in the same manner as in Example 1, except that dimethyl diisobutylmalonate (equimolar amount) was added in the first step as the first internal electron donor compound instead of diethyl diisobutylmalonate, diethyl maleate (equimolar amount) was added in the second step as the second internal electron donor compound instead of dimethyl diisobutylmalonate, and diethyl maleate (equimolar amount) was added in the third step as the third internal electron donor compound instead of dimethyl diisobutylmalonate.

The solid catalyst component (A13) had a magnesium atom content of 19.5 mass %, a titanium atom content of 2.2 mass %, a halogen atom content of 59.8 mass %, a total carboxylic acid diester compound content of 15.3 mass %, and a diethyl maleate content of 4.2 mass %.

Preparation of Polymerization Catalyst and Polymerization of Propylene

A propylene polymerization catalyst and an ethylene-propylene copolymerization catalyst were prepared in the same manner as in Example 1, except that the solid catalyst component (A13) was used instead of the solid catalyst component (A1), and polypropylene and an ethylene-propylene block copolymer were produced in the same manner as in Example 1. The propylene polymerization activity, the ethylene-propylene block copolymerization activity (ICP activity), and the resulting polymers were evaluated in the same manner as described above. The results are shown in Tables 6 and 7.

Example 16

A solid catalyst component (A14) was produced in the same manner as in Example 1, except that diethyl cyclohexene-1,2-dicarboxylate (equimolar amount) was added in the first step as the first internal electron donor compound instead of diethyl diisobutylmalonate, diethyl cyclohexene-1,2-dicarboxylate (equimolar amount) was added in the second step as the second internal electron donor compound instead of dimethyl diisobutylmalonate, and diethyl cyclohexene-1,2-dicarboxylate (equimolar amount) was added in the third step as the third internal electron donor compound instead of dimethyl diisobutylmalonate.

The solid catalyst component (A14) had a magnesium atom content of 19.8 mass %, a titanium atom content of 2.0 mass %, a halogen atom content of 59.6 mass %, and a total carboxylic acid diester compound content of 13.8 mass %.
Preparation of Polymerization Catalyst and Polymerization of Propylene A propylene polymerization catalyst and an ethylene-propylene copolymerization catalyst were prepared in the same manner as in Example 1, except that the solid catalyst component (A14) was used instead of the solid catalyst component (A1), and polypropylene and an ethylene-propylene block copolymer were produced in the same manner as in Example 1. The propylene polymerization activity, the ethylene-propylene block copolymerization activity (ICP activity), and the resulting polymers were evaluated in the same manner as described above. The results are shown in Tables 6 and 7.

Example 17

A solid catalyst component (A15) was produced in the same manner as in Example 1, except that dipropyl cyclohexene-1,2-dicarboxylate (equimolar amount) was added in the first step as the first internal electron donor compound instead of diethyl diisobutylmalonate, dipropyl cyclohexene-1,2-dicarboxylate (equimolar amount) was added in the second step as the second internal electron donor compound instead of dimethyl diisobutylmalonate, and dipropyl cyclohexene-1,2-dicarboxylate (equimolar amount) was added in the third step as the third internal electron donor compound instead of dimethyl diisobutylmalonate.

The solid catalyst component (A15) had a magnesium atom content of 20.0 mass %, a titanium atom content of 2.3 mass %, a halogen atom content of 60.3 mass %, and a total carboxylic acid diester compound content of 12.5 mass %.
Preparation of Polymerization Catalyst and Polymerization of Propylene A propylene polymerization catalyst and an ethylene-propylene copolymerization catalyst were prepared in the same manner as in Example 1, except that the solid catalyst component (A15) was used instead of the solid catalyst component (A1), and polypropylene and an ethylene-propylene block copolymer were produced in the same manner as in Example 1. The propylene polymerization activity, the ethylene-propylene block copolymerization activity (ICP activity), and the resulting polymers were evaluated in the same manner as described above. The results are shown in Tables 6 and 7.

TABLE 6

|  | Polymerization activity (g-pp/g-cat) | MFR (g/10 min) | XS (mass %) | NMR-mmmm (%) | FM (MPa) |
|---|---|---|---|---|---|
| Example 15 | 55,300 | 41 | 1.6 | 97.6 | 1540 |
| Example 16 | 48,800 | 27 | 1.0 | 98.0 | 1570 |
| Example 17 | 53,400 | 33 | 1.2 | 97.8 | 1570 |

TABLE 7

|  | ICP polymerization activity (g-pp/g-cat) | Block ratio (mass %) |
|---|---|---|
| Example 15 | 14,100 | 26 |
| Example 16 | 18,100 | 28 |
| Example 17 | 14,400 | 26 |

As is clear from the results shown in Tables 2 to 7, the olefin polymerization catalysts respectively prepared using the solid catalyst components obtained in Examples 1 to 17 achieved high olefin polymerization activity, and achieved high ICP activity (i.e., exhibited high sustainability of olefin polymerization during homopolymerization or copolymerization), and the resulting homopolymers had a satisfactory melt flow rate (MFR) (i.e., exhibited excellent moldability), and had a satisfactory xylene-soluble content (XS) (i.e., exhibited excellent stereoregularity). The resulting copolymers had a satisfactory block ratio (i.e., excellent impact copolymer (ICP) copolymerization performance was achieved) due to high copolymerization activity. A high flexural modulus (FM), high Izod impactive strength, and excellent rigidity were also obtained.

As is clear from the results shown in Table 2, since the olefin polymerization catalysts obtained in Comparative Examples 1 to 3 were prepared using the solid catalyst component produced without performing the third step (Comparative Example 1), or prepared using the solid catalyst component produced without performing the second step (Comparative Example 2), or prepared using the solid catalyst component produced without performing the second step and the third step (Comparative Example 3), the sustainability of olefin polymerization activity (homopolymerization activity and ICP activity) was low, or the block ratio of the impact copolymer obtained by copolymerization was low, or the resulting polymer had low stereoregularity, and the copolymerization performance and rigidity were insufficient.

INDUSTRIAL APPLICABILITY

The embodiments of the invention thus provide a method for producing a novel solid catalyst component for olefin polymerization that achieves excellent olefin polymerization activity and activity with respect to hydrogen during polymerization when homopolymerizing or copolymerizing an olefin, and can produce an olefin homopolymer or copolymer that exhibits a high MFR, high stereoregularity, and excellent rigidity while achieving high sustainability of polymerization activity, and also provide a novel olefin polymerization catalyst and a method for producing an olefin polymer.

The invention claimed is:

1. A method for producing a solid catalyst component for olefin polymerization comprising:
   a first step that brings a magnesium compound, a tetravalent titanium halide compound, and one or more first internal electron donor compounds excluding an aromatic dicarboxylic acid diester into contact with each other to effect a reaction, followed by washing;
   a second step that brings a tetravalent titanium halide compound and one or more second internal electron donor compounds into contact with a product obtained by the first step to effect a reaction, followed by washing; and
   a third step that brings one or more third internal electron donor compounds into contact with a product obtained by the second step in an inert organic solvent for which the unreacted tetravalent titanium halide compound content from the second step is controlled to 0 to 5 mass %, without adding a tetravalent titanium halide compound, to effect a reaction.

2. The method for producing a solid catalyst component for olefin polymerization according to claim 1, wherein the first internal electron donor compound is one or more compounds selected from an aliphatic polycarboxylic acid ester, an alicyclic polycarboxylic acid ester, and an ether compound.

3. The method for producing a solid catalyst component for olefin polymerization according to claim 1, wherein the second internal electron donor compound is used so that a ratio "molar quantity of the second internal electron donor compound/molar quantity of the magnesium compound" is 0.001 to 10.

4. The method for producing a solid catalyst component for olefin polymerization according to claim 1, wherein the third internal electron donor compound is used so that a ratio "molar quantity of the third internal electron donor compound/molar quantity of the magnesium compound" is 0.001 to 10.

5. The method for producing a solid catalyst component for olefin polymerization according to claim 1, wherein the first internal electron donor compound, the second internal electron donor compound, and the third internal electron donor compound are used so that a relationship "molar quantity of the first internal electron donor compound>molar quantity of the second internal electron donor compound≥molar quantity of the third internal electron donor compound" is satisfied.

* * * * *